United States Patent [19]

Nguyen

[11] Patent Number: 5,506,790
[45] Date of Patent: Apr. 9, 1996

[54] SINGLE-CHIP MICROCOMPUTER PROGRAMMABLE POWER DISTRIBUTOR

[76] Inventor: Sanh K. Nguyen, 2251 Reagan Blvd., Carrollton, Tex. 75006

[21] Appl. No.: 265,200

[22] Filed: Jun. 24, 1994

Related U.S. Application Data

[63] Continuation-in-part of Ser. No. 822,348, Jan. 15, 1992.
[51] Int. Cl.⁶ .................................................. G06F 9/06
[52] U.S. Cl. ........................... 364/492; 364/483; 364/141; 307/38; 307/115
[58] Field of Search ..................... 364/492, 483, 364/480, 141, 145, 579; 340/825.71; 307/38, 115; 361/88; 395/101, 114, 275; 341/154

[56] References Cited

U.S. PATENT DOCUMENTS

| | | | |
|---|---|---|---|
| 4,674,031 | 6/1987 | Siska, Jr. ................................. | 364/492 |
| 4,747,041 | 5/1988 | Engel et al. ............................. | 364/492 |
| 4,771,185 | 9/1988 | Feron et al. ............................. | 364/492 |
| 4,812,847 | 3/1989 | Stewart et al. ......................... | 341/154 |
| 4,835,706 | 5/1989 | Asahi ...................................... | 364/492 |
| 4,964,058 | 10/1990 | Brown, Jr. .............................. | 364/492 |
| 5,021,983 | 6/1991 | Nguyen et al. ......................... | 364/707 |

OTHER PUBLICATIONS

"X-10 Owner's Manual," X-10 U.S.A., 1988.
The Linear Databook, National Semiconductor Corporation; pp. 1-251 to 1-253; 5-38 to 5-39; 5-42 to 5-45, No Date.
The TTL Databook for Design Engineers, Second Edition, Texas Instruments; pp. 5-7 to 5-8; 5-38; 5-46; 5-50; 5-53 to 5-54; 5-58; 5-70; 6-2 to 6-3; 6-10 to 6-11; 6-15 to 6-19; 6-68 to 6-86; 7-157 to 7-164; 7-134 to 7-137; 7-253 to 7-258; 7-306 to 7-315; 7-388 to 7-390; 7-489 to 7-495, No Date.
Siemens publication; pp. 193-196, No Date.
Black Box Catalog, Jan. 1991; pp. 63-64.
MacConnection; Fall 1991; p. 115.

*Primary Examiner*—Emanuel T. Voeltz
*Assistant Examiner*—Kyle J. Choi
*Attorney, Agent, or Firm*—Crutsinger & Booth

[57] ABSTRACT

Apparatus and method are provided for intelligently controlling an electrical power distributor for a personal computer, its peripherals, and other devices. The apparatus includes a parallel interface; single-chip microcomputer; plurality of relays; power source connector; and plurality of electrical outlets. The parallel interface can be removably connected through a parallel cable to a parallel port of a personal computer. The single-chip microcomputer has a clock to keep time independent of the personal computer. In response to programming instructions from the personal computer, the single-chip microcomputer controls the relays to selectively connect and disconnect the power lead connector to the electrical outlets of the distributor. Communicating with the distributor is made user friendly by including a software prorgram for the personal computer that translates simple commands from the user into commands sent through the parallel port of the personal computer to the distributor. The distributor can share the parallel port of the personal computer with another peripheral device, such as a printer, by use of a split-Y parallel cable or similar split cable or connector. The distributor reacts only to particular data transmitted on the split-Y parallel cable and ignores other data. A preferred embodiment of the distributor also includes a phone ring interface for detecting and responding to telephone ring signals. The single-chip microcomputer can be programmed by the personal computer to respond to one or more preselected sequences of one or more phone ring signals.

16 Claims, 20 Drawing Sheets

| RESET | INIT |
|---|---|
| TIMER INTERRUPT | TIRQ |
| HARDWARE INTERRUPT | HIRQ |
| SOFTWARE INTERRUPT | INIT |
| POWER ON | INIT |

FIG. 9A : VECTOR TABLE

SINGLE-CHIP MICROCOMPUTER PROGRAMMABLE POWER DISTRIBUTOR

CROSS-REFERENCE TO RELATED APPLICATION

This is a continuation-in-part of pending U.S. patent application Ser. No. 07/822,348 entitled "Programmable Power Distributor" filed Jan. 15, 1992.

TECHNICAL FIELD

The invention relates to a control system for an electrical power distributor. More particularly, the invention relates to an apparatus and method for intelligently distributing electrical power to a personal computer, peripherals, and other electrical devices at preselected times for reducing unnecessary power consumption. The distributor apparatus is connected to communicate with a personal computer through a parallel port of the personal computer. A communication protocol allows the distributor apparatus to share the parallel port of the personal computer with another peripheral, such as a printer, without the need for a switching device. After the personal computer provides the distributor apparatus with command data, the intelligent power distributor can turn the personal computer and other devices on or off at preselected times or after predetermined periods of non-use to conserve electrical power.

BACKGROUND OF INVENTION

Electrical power to personal computers and peripheral devices is usually left on at all times during the day. However, the actual time most personal computers and peripheral devices are used is usually only a small fraction of the time they are on. Therefore, a large portion of the electric power consumed by personal computers and peripherals is wasted. Often lighting and other devices near the personal computer are also unnecessarily left on. The cost of wasted electricity can accrue to a substantial sum.

Personal computers, peripherals, and many other devices have delicate electronic circuitry. While the devices are on, they are subject to damage by electrical voltage spikes and power surges. Voltage spikes and power surges are caused by the load on a power supply line suddenly changing, high voltage shorts, and thunderstorm electrical discharges. If electronic circuitry is connected to the power line during a voltage spike or power surge, the electronic circuitry may be damaged. The personal computer is usually the most delicate and most expensive piece of equipment connected to the electrical power supply line. Therefore, the personal computer should be the most protected against voltage spikes and power surges. Surge protectors offer some protection against voltage spikes and power surges in the power supply line. However, the best protection results from disconnecting or turning off the electronic circuitry when not in use.

Some electrical power distributors for personal computer systems have manual switches for controlling the power to individual lines, but the user must constantly make conscious efforts to minimize power consumption and prolong the life of electrical circuitry connected to the power distributor. Usually, the personal computer user simply leaves all the equipment turned on. Thus, there is a long-felt need for a way to make environmentally conscious, green-computing easier.

SUMMARY OF THE INVENTION

The present invention provides apparatuses and methods for programmably distributing power to a personal computer, peripherals, and other devices. An intelligent power distributor according to the present invention includes the following: a power lead connector for a distributor; a parallel interface; single-chip microcomputer; a plurality of relays; and a plurality of electrical outlets. The power lead connector can be connected through a power lead to a power source, such as an electrical wall outlet, for providing power to the plurality of electrical outlets. An AC/DC converter is preferably connected to the power lead connector of the distributor for converting AC power to DC current to drive the electronic circuits of the distributor. The parallel interface can be removably connected through a parallel cable to a parallel port of a personal computer. The single-chip microcomputer of the distributor apparatus includes an internal clock, memory mapped input/output, vectored interrupts, bootstrap program in read-only memory (ROM), erasable programmable read-only memory (EPROM), random-access memory (RAM), and bidirectional input/output (I/O) lines. The personal computer and single-chip microcomputer of the distributor communicate through the parallel port of the personal computer, the parallel cable, and parallel interface of the distributor. The single-chip microcomputer of the distributor keeps time independent of the personal computer. In response to programming instructions from the personal computer, the single-chip microcomputer controls the relays to selectively connect and disconnect the power lead connector to the electrical outlets of the distributor. Preferably, the relays are solid state with zero volt switching so that the AC power can be turned on or off more smoothly, minimizing radio-frequency interference (RFI) and electromagnetic interference (EMI). Communicating with the distributor is made user friendly by including a software package for the personal computer that translates simple commands from the user into commands sent through the parallel port of the personal computer to the distributor.

In a preferred embodiment of the invention, the power lead of the personal computer is connected to a designated electrical outlet of the distributor. The outlet designated for the personal computer has a default "on" setting; thus, before the distributor actually receives any programming instructions through the parallel port of the personal computer, the default or reset condition of the distributor provides power to the personal computer. The personal computer can program the distributor with a preselected computer time-out period and instruct it to cut power to the personal computer. The single-chip microcomputer of the distributor is capable of keeping time independent of the personal computer. After the preselected computer time-out period, the distributor automatically turns the personal computer back on. A batch file in the personal computer can then initiate desired personal computer programs. For example, according to one particular aspect of the invention, the distributor can be preprogrammed by a personal computer scheduler program to switch off power to the personal computer and then turn the personal computer back on at a preselected time for conducting unattended tasks, for example, disk backup. The personal computer can be turned on at any time by resetting the distributor.

The distributor can also be programmed to control power to other peripherals or electrical devices, in real time or at the times preprogrammed by the personal computer. These functions save electric power when the personal computer needs to be on at a later time but not in the intervening time-out period. These features also address the problems of voltage spikes and power surges.

According to another aspect of the invention, the intelligent power distributor can optionally share a parallel port of the personal computer with another peripheral device, such as a printer. The distributor and printer can share a single parallel port of the personal computer by use of a split-Y parallel cable or similar split cable or connector. The single-chip microcomputer of the distributor distinguishes between commands intended for the distributor and commands intended for the other peripheral connected to the parallel port of the personal computer. The commands that control the distributor would be extremely unlikely to match the commands that control the peripheral, and vice-versa. The distributor can operate with any other device attached to a parallel port of the personal computer without interfering with the normal operation of the peripheral and without the need for a manual switching device. Thus, the intelligent power distributor does not require a dedicated parallel port, and the user does not have to manually connect or switch the parallel port of the personal computer to the distributor to share a single parallel port with another peripheral.

According to yet another aspect of the invention, an intelligent power distributor can include a phone ring interface for detecting telephone ring signals and notifying the single-chip microcomputer of the prepense of a ring signal. The single-chip microcomputer can be programmed to respond to one or more telephone ring signals or a preselected sequence of telephone ring signals. The single-chip microcomputer can also be programmed to analyze the signal burst of a telephone ring. This can be useful, for example, because different telephone systems use different ring signal bursts. Thus, the distributor can be programmed for use in different countries that have different telephone systems or other applications. The distributor can work with the personal computer so that the combination can be used as a telephone answering machine or the personal computer can be turned on and operated from a remote location through a modem. Thus, the personal computer does not have to be left on to receive calls. The preferred embodiment of the distributor can be programmed to turn off the power supply to the personal computer, and then turn the personal computer back on in response to a specified sequence of signals from a telephone line, for example, three rings. The power distributor can be programmed to check the sequence of telephone rings to ensure that the personal computer is not turned on unintentionally. Therefore, this feature of the disclosed invention also addresses the problems wasted electrical power, voltage spikes, and power surges.

The distributor of the invention can be combined with surge protection circuits for each of the electrical outlets of the distributor. Thereby, the distributor also can protect the devices from voltage spikes and power surges when they are turned on.

The apparatus and method of the invention are directed toward solving the problem of wasted electric power. They also minimize the problem of voltage spikes and power surges, which can damage the electronic circuitry of the personal computer and other devices. The distributor allows the user of the personal computer to specify the time, manner, and sequence of switching power on and off to the personal computer itself, personal computer peripheral devices, and other devices electrically connected to the distributor. Thus, the distributor minimizes power consumption and it also minimizes voltage spikes and power surges to which the personal computer and other devices having delicate electronic circuitry are subjected.

Accordingly, objects and advantages of the present invention include: (1) reducing the amount of wasted electric power caused by unnecessarily leaving personal computers and other devices turned on; (2) reducing the exposure of the delicate electronic circuitry of the personal computer and other devices to voltage spikes or power surges; (3) providing the personal computer user with a means to program the time and sequential order in which the user wants the personal computer, peripherals, and other devices supplied with electric power; (4) allowing the personal computer user to program a time-out period after which the personal computer will be turned back on; (5) using the parallel port for communicating with the distributor instead of a serial port because a serial port is often overloaded by other devices; (6) having the distributor of the invention share a parallel port of a personal computer with another device such that the operation of the distributor and the peripheral do not interfere with the function of one another; (7) reducing the user's responsibility for manually turning on and off the personal computer, its peripherals, and other devices; (8) enabling the personal computer user to control the power of the devices attached to the distributor from the keyboard of the personal computer; and (9) providing the flexibility to control the personal computer through a telephone line.

Therefore, in combination with the appropriate personal computer software, the intelligent power distributor can reduce the electrical consumption of the computer system and other devices while increasing productivity. For example, the personal computer can back-up from hard disk to tape drive after business hours to avoid tying up the personal computer during the procedure. The personal computer can make facsimile transmissions after business hours to take advantage of lower telephone rates, turning the personal computer off when the tasks are completed, all without human presence at the time. Software could also keep track of the total time power has been supplied to an electrical device or personal computer peripheral. Thus, the power distributor and personal computer can be used to monitor electrical consumption and indicate need for periodic maintenance of electrical devices.

Further objects, advantages, and features of the invention will become apparent to those skilled in the art upon reading the following detailed description of a preferred embodiment of the invention.

BRIEF DESCRIPTION OF THE DRAWINGS

The accompanying drawing is incorporated into and forms a part of the specification to illustrate several examples of the invention. The drawing is only illustrative purposes only and is not to be construed as limiting the invention to only the illustrated and described examples. Various advantages and features of the invention will be apparent from the following description taken in connection with the attached drawing in which:

FIGS 9A through 9S, inclusive show a detailed flow chart of a preferred algorithm for the firmware programming of the single-chip microcomputer of the distributor, wherein FIG. 9A the vector table that is used to jump the algorithm to appropriate routines when specified conditions arise

FIG. 9J is a routine called "READ RING" and FIG. 9K is a routine called "RING PROCEDURE";

FIG. 9S is a timer interrupt routine called "TIRQ"; and

DETAILED DESCRIPTION OF A PREFERRED EMBODIMENT

Figure 1:
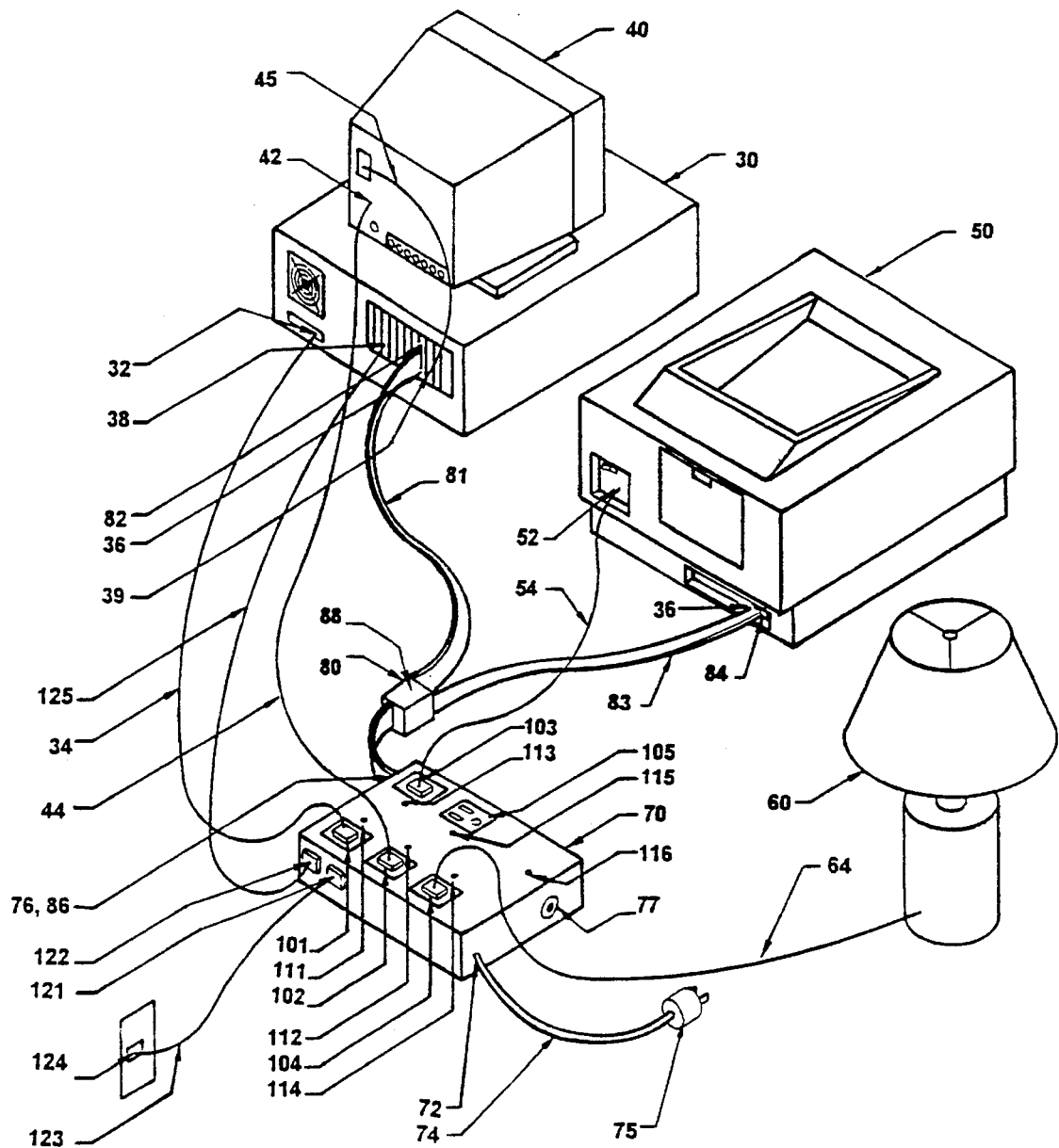
FIG. 1 is a diagrammatic view of a personal computer, a monitor, a peripheral, and another device, such as a lamp, connected to the power outlets of a distributor according to the present invention, wherein the peripheral and the distributor communicate with the same parallel port of the personal computer through a split-Y parallel cable.

Referring now to FIG. 1 of the drawing, a personal computer 30, monitor 40, printer 50, and lamp 60 are shown connected to the distributor, generally referred to by the numeral 70. As will hereinafter be described in detail, the personal computer 30 communicates with printer 50 and distributor 70 through a split-Y parallel cable, generally referred to by the numeral 80.

Personal computer 30 is a conventional personal computer having a computer power socket 32, computer power cord 34, parallel port 36, modem jack 38, and video connector 39. The personal computer 30 also has conventional central processing unit and disk drives (not shown) for loading and running appropriate software for controlling the distributor 70. Monitor 40 is a conventional computer monitor having a monitor power socket 42, monitor power cord 44, and monitor video cable 45 connected to video connector 39 of the computer 30. Printer 50 represents a conventional computer peripheral having a printer power socket 52, printer power cord 54, and a parallel port 56. Lamp 60 represents any type of electrical device that the computer user may desire to control through the distributor 70. Lamp 60 has a lamp power cord 64. Each of the power cords 34, 44, 54, and 64 has a plug for connecting the cord to an AC outlet.

As shown in FIG. 1, the distributor 70 has a distributor power socket 72, a distributor power cord 74, and a parallel port 76. Distributor power cord has a plug 75 for connecting the cord to an AC outlet, such as a wall socket AC power source (not shown).

Distributor 70 has a plurality of AC outlets 101–105. A plurality of light emitting diodes (LEDs) 111–115 are associated with AC outlets 101–105, respectively. As will be explained in more detail, LED 111 is lighted to show when AC power is connected to distributor AC outlet 101, LED 112 is lighted to show when AC power is connected to distributor AC outlet 102, and so on. Distributor AC outlets are preferably protected with a circuit breaker 77.

Distributor 70 also preferably has an LED 116, which can be used to indicate the following three states: (1) when the LED 116 is steady on, this indicates that the telephone ring detector mode is enabled, and when it is steady off, the telephone ring detector mode is disabled; (2) when the LED 116 turns off for about two second, this indicates that a telephone ring signal is in the process of being detected, after which the LED turns back to steady on; and (3) when the LED 116 is rapidly flashing, for example, on for ¼ second and off for ¼ second, this indicates that there has been a power failure or voltage surge event that caused the distributor 70 to shut down the personal computer 30 and other devices.

The distributor 70 selectively provides power to distributor AC outlets 101–105 to turn on and off the personal computer 30, monitor 40, printer 50, and lamp 60. Distributor AC outlet 101 provides power to personal computer 30 at power socket 32 through computer power cord 34. Distributor socket 102 provides power to monitor 40 at power socket 42 through monitor power cord 44. Distributor socket 103 provides power to printer 50 at printer power socket 52 through peripheral power cord 54. Distributor socket 104 provides power to an auxiliary device, such as lamp 60 through lamp power cord 64. Distributor socket 105 is available for a second auxiliary device.

The AC outlets 101–105 can have numbers or other indicia associated therewith (not shown). These markings indicate which AC outlet is intended for the personal computer 30, its monitor 40, the printer 50, a first auxiliary device AUX-1, such as lamp 60, and a second auxiliary device AUX-2. These markings preferably correspond to the identifying indications in the computer software for controlling the individual AC outlets 101–105.

All the various power sockets and outlets, for example, computer power socket 32, monitor power socket 42, printer power socket 52, and distributor power socket 72 and outlets 101–105 can be either male or female electrical connectors, as appropriate. All the various power cords also can have either male or female electrical connectors, of standard or non-standard design, as appropriate.

The personal computer 30 is used to control the printer 50 and programmable power distributor 70. The personal computer 30 communicates with the printer 50 and distributor 70 through split-Y parallel cable 80. The split-Y parallel cable 80 has computer cable portion 81 with a 25-pin D male connector 82 for the computer parallel port 36, printer cable portion 83 with a 25-pin D female connector 84 for the printer parallel port 56, and distributor cable portion 85 with a 10-pin connector 86 for the distributor parallel port 76. As will be described in more detail with reference to FIG. 3, the parallel conductors of split-Y parallel cable portions 81, 83, and 85 are joined by an adapter 88. In the preferred embodiment of the invention, the 10-pin connector 86 is more than sufficient for the personal computer 30 to communicate with the distributor 70.

The split-Y parallel cable 80 allows the distributor 70 to monitor and receive signals from the personal computer 30 while the personal computer parallel port 36 of the personal computer 30 is used to communicate with printer 50. In other words, the split-Y parallel cable 80 electrically connects the distributor 70 and the printer 50 in parallel and the parallel combination is connected to the parallel port 36 of the personal computer 30.

As will hereinafter be explained in detail, the distributor 70 is designed to accept command instructions from the personal computer 30 only after a specific protocol "handshake" has been established. The protocol is established so that the distributor 70 does not react to the instructions that are sent to the printer 50 in any way. Similarly, the printer 50 is extremely unlikely to react to the specific protocol and data transmissions on the shared split-Y parallel cable 80, therefore, the normal operation of the printer 50 is assured.

Distributor 70 preferably also has telephone jacks 121 and 122. Telephone line in jack 121 is connectable to a telephone line 123, which is connected to a telephone outlet, such as wall outlet 124. Telephone line out jack 122 is connectable through modem line 125 to the modem jack 38 of personal computer 30.

Figure 2:
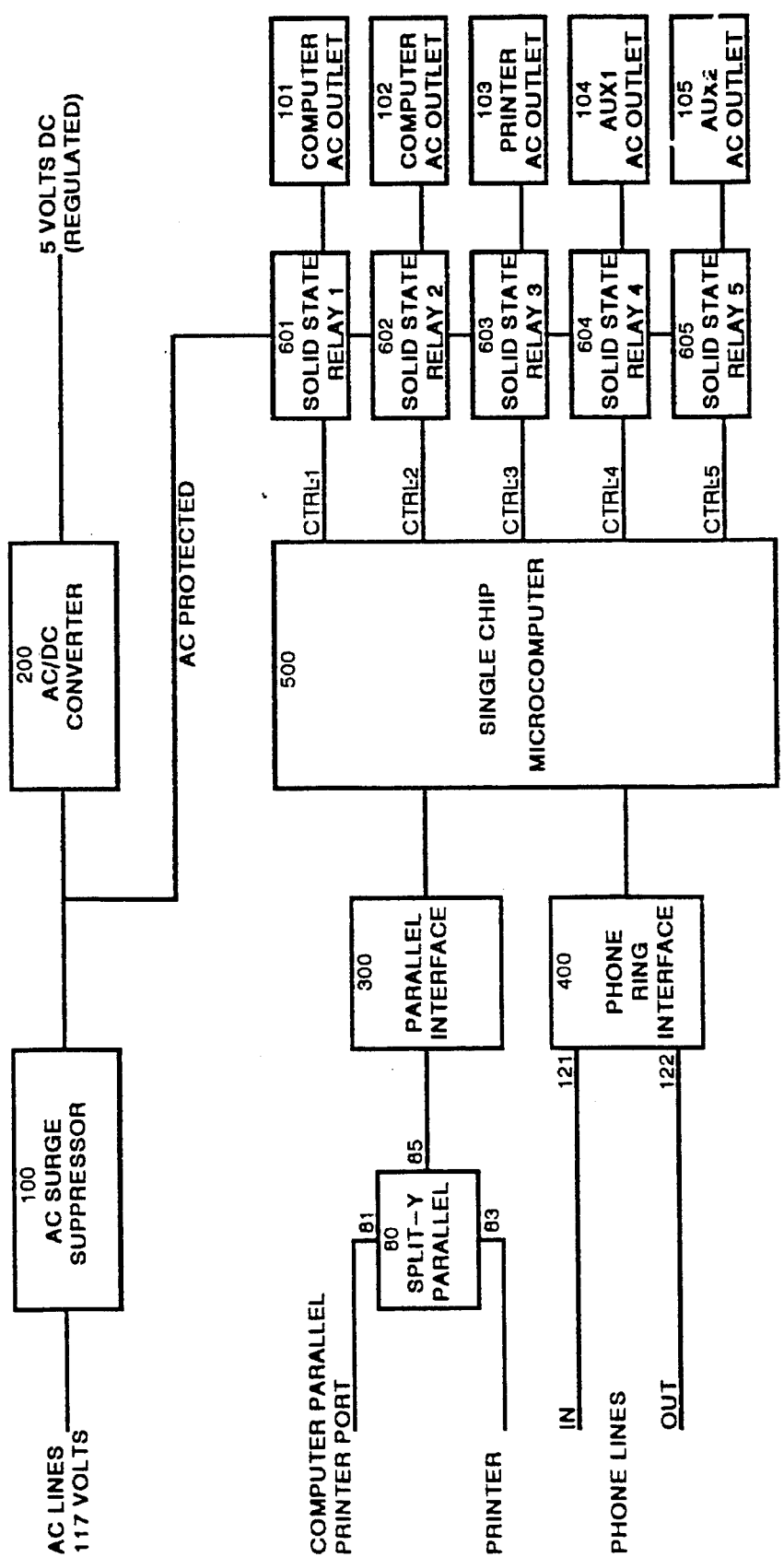
FIG. 2 is a block diagram of the major components of a preferred embodiment of the distributor, including: an AC surge suppressor, an AC/DC converter to 5 Volt DC, a split-Y parallel cable, a parallel interface, a phone ring interface, a single-chip microcomputer, a plurality of solid-state relays, and a plurality of AC outlets.

Referring now to the block diagram shown in FIG. 2 of the drawing, the preferred embodiment of the distributor 70 includes the following major components: an AC surge suppressor 100; AC/DC converter 200; parallel interface 300; phone ring interface 400; single-chip microcomputer 500; a plurality of relays, for example, solid-state relays 601–605, and a plurality of AC outlets, for example, AC outlets 101–105. The connecting arrows between the components represent the flow of information or commands. The relays 501–505 connect and disconnect the individual distributor AC outlets 101–105, respectively, to the power source.

The surge suppressor 100 is for protecting against AC power surges and spikes.

The AC/DC converter 200 converts AC to 5 Volt regulated DC for driving the electronic circuitry of the intelligent power distributor 70.

The parallel interface 300 is for connecting the parallel port 76 of the distributor 70 to the single-chip microcomputer 500. The parallel port 36 of the personal computer 30 is connected through the split-Y parallel cable 80 to the parallel port 76 of distributor 70 and the parallel port 56 of printer 50.

The phone ring interface 400 can receive input from a telephone line 123 at jack 121 of the distributor. The phone ring interface 400 also protects the telephone line output at jack 122 of the distributor 70 against telephone line spikes and surges. The distributor 70 can be preprogrammed to close relays 601 and 602 to turn on the power to the personal computer 30 and monitor 40 in response to a specified sequence of ring signals on the telephone line 123. Therefore, the distributor can allow the personal computer to be used as an answering machine or to be remotely operated through the telephone line, but it is not necessary to leave the personal computer turned on at all times. Thus, the telephone line can be used to remotely program the personal computer 30 after the distributor 70 turns it on. Furthermore, the distributor can be programmed not to turn the personal computer on if the telephone is picked up before the specified number of rings or the caller terminates the connection before the specified number of rings.

The single-chip microcomputer 500 monitors the data that the personal computer 30 sends through the split-Y parallel cable 80 to the printer 50 and distributor 70. If the data appearing at the parallel interface 300 of the distributor 70 matches a unique protocol sequence, the single-chip microcomputer 500 serially loads commands and data from the parallel interface 300. A control word or command, of course, is simply a predetermined string of data bits sent by the personal computer through the parallel split-Y cable 80 that is intended to be recognized by the distributor 70, but not by the printer 50. At each command, the single-chip microcomputer 500 checks a strobe data line of the personal computer parallel port 36 to verify that the data is intended for the distributor 70 and that the trigger protocol was not an improbable combination of data intended for the printer 50. If the strobe check fails, the single-chip microcomputer 500 aborts the command sequence.

This data programs the single-chip microcomputer 500. The controller 500 can be programmed to turn on the personal computer 30 and monitor 40 at a particular time, for example, six hours later. In the preferred embodiment, the controller 500 operates as a digital counter that counts down a programmed number of time intervals that equal the time-out period. After the computer time-out period, the controller 500 instructs the relay 601 to turn on the personal computer 30. Once the personal computer is turned on, it can instruct the distributor 70 to turn on or off the other devices connected to the distributor.

The single-chip microcomputer 500 periodically retransmits commands to the relays 601, 602, 603, 604, and 605 to maintain the relays open or closed as instructed by the personal computer 30. This is to guard against the possibility that the relays are mis-triggered for any reason, such as overload, power surge, high potential short, etc. Thus, the firmware of the distributor 70 periodically checks the status of the relays 601–605 and retransmits the commands.

The relays 601, 602, 603, 604, and 605 preferably include solid-state relay switches activated by the controller 500. The relays 601–605 can be normally open or normally closed, as appropriate. These relays are used to connect or disconnect the AC outlet 72 to the various distributor AC outlets 101105, thereby providing electrical power to whatever devices are serviced by the individual AC outlets 101–105 of the distributor 70.

The personal computer 30 instructs the distributor 70 to connect (turn on) and disconnect (turn off) the power supply to the personal computer, peripherals, and other devices connected to the AC outlets 101–105 of the distributor. While the personal computer 30 is on, it can send instructions to the distributor 70 to turn on and off any peripheral device. The personal computer can instruct the distributor to turn off the personal computer itself and then turn the personal computer back on after a preset time-out period. While the personal computer is turned off, the peripheral and other devices can be left on or off. The phone ring interface 300 can be used to turn on the personal computer in response to a series of telephone ring signals on the telephone line 123.

Now that the cooperation and functions of the various elements of a preferred embodiment of the distributor 70 have been described, a more detailed description of the preferred electrical circuitry is appropriate.

For convenience of description, a direct current positive voltage signal, typically about +5 Volts, shall be referred to as a "high" signal; and a low voltage signal is typically about zero Volts. Unless the context indicates otherwise, all connections are electrical connections formed by appropriate electrical conductors. Furthermore, unless otherwise indicated, all part numbers are described in the TTL Data Book for Design Engineers, Second Edition (hereinafter the "TTL"), which is published by Texas Instruments. The TTL is incorporated by reference herein in its entirety.

Figure 3:
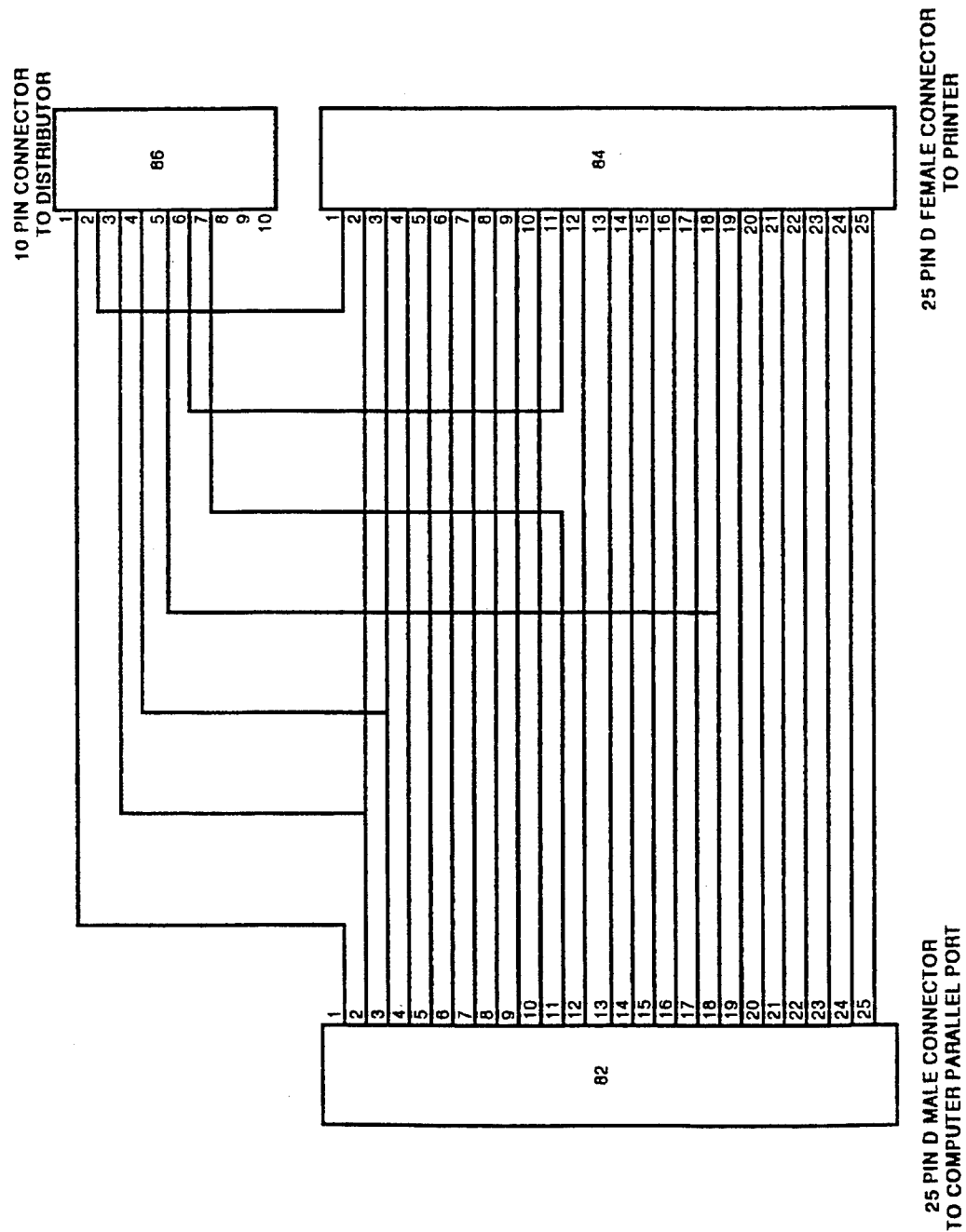
FIG. 3 is a schematic diagram of a preferred embodiment of a split parallel connector so that the distributor can share the parallel port of a personal computer with another peripheral device, such as a printer.

FIG. 3 of the drawing shows a schematic diagram of a preferred embodiment of a split-Y parallel cable 80 so that the distributor can share the parallel port of a personal computer 30 with another peripheral device, such as a printer 50. The 25-pin male connector 82 is for connecting to the parallel port 36 of the personal computer 30. The 25-pin female connector 84 is for connecting to the parallel port 56 of a printer 50. In the presently most preferred embodiment of the invention, the 10-pin distributor connector 86 is sufficient for connecting to the parallel port 76 of the distributor 70. Pins 1 and 2 of distributor connector 86 bridge pin 1 of the connector 82 to pin 1 of the connector 84; and pin 3 of the distributor connector 86 is connected to pin 2 of each of the connectors 82 and 84; pin 4 is connected to pin 3 of each of the connectors 82 and 84; pin 5 is connected to pin 18 of each of the connectors 82 and 84, which is normally a ground, pins 6 and 7 of the distributor connector 86 bridge pin 11 of the connector 82 to pin 11 of the connector 84; and pins 8, 9, and 10 of the distributor connector 86 are not used.

Figure 4:
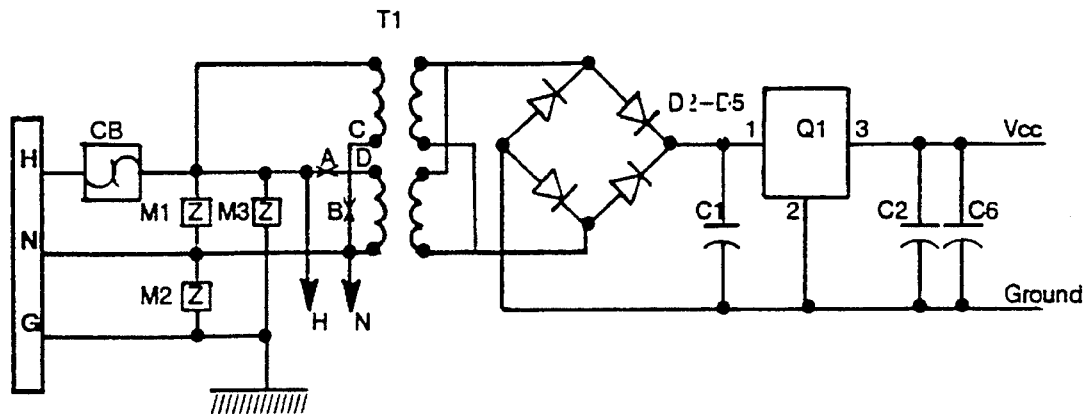
FIG. 4 is a schematic diagram of a preferred embodiment of the AC/DC converter for the electronic circuitry of the distributor.

FIG. 4 of the drawing is a schematic diagram of a preferred embodiment of electronic circuitry for the AC surge suppressor 100 and the AC/DC converter 200 for the electronic circuitry of the distributor 70. The 110 Volt distributor AC outlet 72 (shown in FIG. 1) has three conductors hot, neutral, and ground labeled H, N, and G, respectively. Ground G is connected to ground. The Hot conductor H is protected from overload by circuit breaker CB, which corresponds to circuit breaker 77 shown in FIG. 1. Hot and neutral conductors H and N are connected as shown to three metal oxide variables M1, M2, and M3, which have a maximum clamp voltage of 800 Volts and a surge current of 2.5 kV to protect against voltage spikes, and an 8 Volt AC transformer T1, which steps down the voltage to 8 Volts AC. This low voltage from the transformer T1 is then converted to DC power through the bridge rectifier consisting of four diodes D2–D5, which are described as Part No. 1N4003. The 5-Volt supply voltage Vcc is obtained filtered and regulated through capacitors C1, C2, and C6 and regulator Q1 as shown. Capacitor C1 is electrolytic 1000 microfarad, 16 Volt; capacitor C2 is tantalum 10 microfarad, 50 Volt; capacitor C6 is 0.1 microfarad, 100 Volt; and regulator Q1 is 5 Volt, 1 Ampere. To make the following schematics of the drawing more clear, the connection of the 5-Volt supply voltage Vcc to the various integrated circuit chips is not shown, such being well known to those skilled in the art.

Continuing to refer to FIG. 4, when the distributor 70 is used with a 220 Volt power source, the traces are cut at points A and B and a jump wire from C to D is included. The triac drivers, triacs, and related components hereinafter described must also be changed to work with 220 Volt power source.

Figure 5:
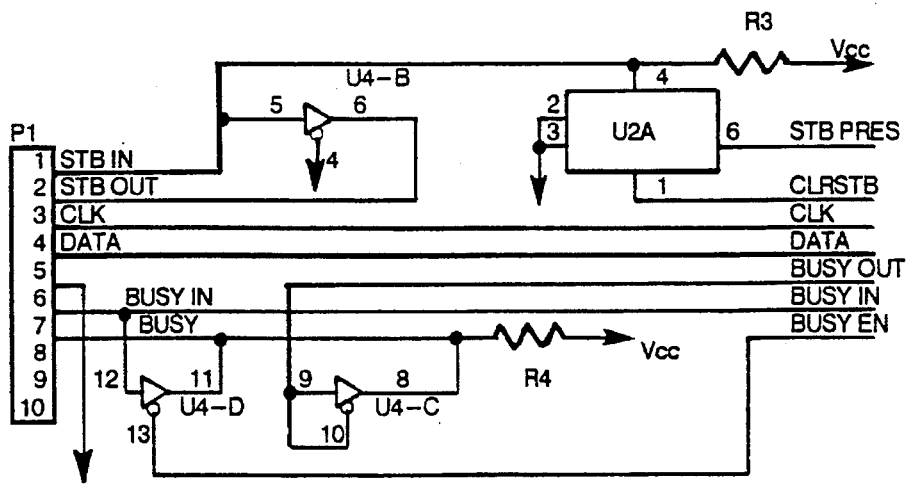
FIG. 5 is a schematic diagram of a preferred embodiment of the parallel interface of the distributor.

FIG. 5 of the drawing is a schematic diagram of a preferred embodiment of the parallel interface 300 of the distributor. Connector 67 has pin PC board connector P1 with 10 pins labeled 1–10. Pin 1 is the strobe in line STB IN; pin 2 is the strobe out line STB OUT; pin 3 is the clock line CLK; pin 4 is the data line DATA; pin 5 is grounded; pin 6 is labeled BUSY IN; pin 7 is labeled BUSY; and pins 8–10 are unused. These pins are connected to integrated circuit U4, Parts B, C, and D, flip-flop U2, Part A, and resistors R3 and R4. Integrated circuit U4 is described in the TTL as Part No. 74HC125; and integrated circuit U2 is described in the TTL as Part No. 74HC74. Resistors R3 and R4 are 4.7K, ¼ Watt.

Figure 6:
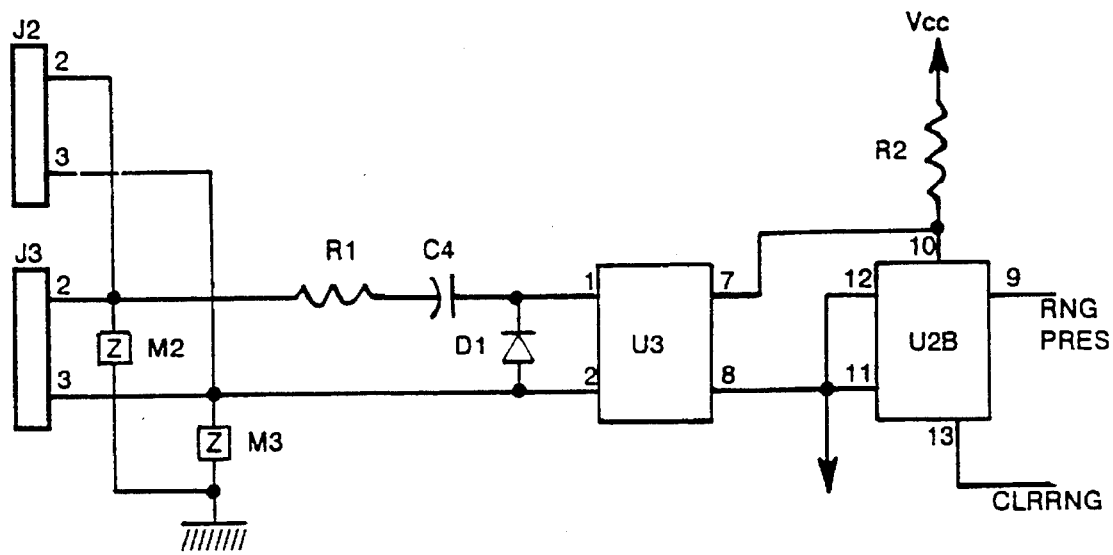
FIG. 6 is a schematic diagram of a preferred embodiment of the phone ring interface of the distributor.

FIG. 6 is a schematic diagram of a preferred embodiment of the phone ring interface 400 of the distributor 70. The phone ring interface 400 uses the changing voltages in the telephone line 123 caused by the ring signal to communicate with the distributor 70. The incoming telephone line 123 is connected to the leads of the jack 121 of the distributor 70 as shown in FIG. 1. The telephone jack 121 is connected to PC board phone jack J3. The outgoing telephone line 125 is connected to the telephone jack 122 as shown in FIG. 1. The telephone jack 122 is connected to PC board phone jack J2. Thus, incoming telephone line 123 can be connected at PC board phone jack J3, and outgoing telephone lines 125 can be connected at PC board phone jack J2.

Incoming telephone line 123 from jack J3 are connected to two metal oxide variables M4 and M5, which have a maximum clamp voltage of 380 Volts to protect against phone line voltage spikes. The telephone lines are also connected to resistor R1, capacitor C4, diode D1, and integrated circuit U3 as shown for detecting a telephone ring signal and convening it to a direct current signal. Resistor R1 is 4.7K, ¼ Watt; capacity C4 is 25 picofarad, 1000 Volt; diode D1 is described as Part No. 1N4003; and integrated circuit U3 is an IDL-1 Opto-isolator. Integrated circuit flip-flop U2, Part B, is incorporated to latch each ring signal. Flip-flop U2 is described in the TTL as Part No. 74HC74. When a telephone ring is initiated, the flip-flop U2, Part B, is set at pin 10. Therefore, according to the logic of U2, Part B, pin 9 will be high to notify the single-chip microcomputer U1, at Port C, pin 9 (see FIG. 7). After receiving this ring present signal, the single-chip microcomputer U1, pin 19, will send back a reset signal to U2, Part B, at pin 13 to clear the flip-flop.

Figure 7:
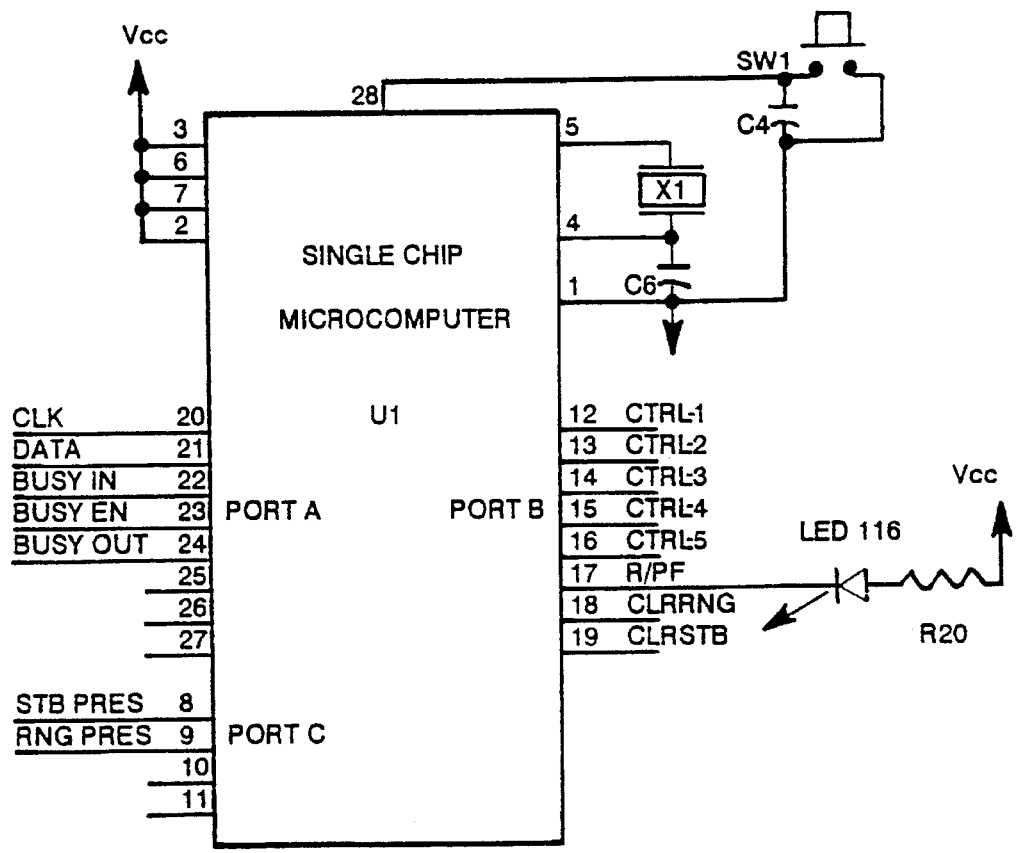
FIG. 7 is a schematic diagram of a preferred embodiment of the single-chip microcomputer circuit of the distributor.

Referring now to FIG. 7, a preferred embodiment of the single-chip microcomputer 500 and its connections is illustrated. In the presently most preferred embodiment of the invention, a single-chip microcomputer U1 is used. This microcomputer U1 is a Motorola single chip single-chip microcomputer Part No. MC68705P3, which is an 8-bit EPROM microcomputer unit. The MC68705P3 (High-Density NMOS) Microcomputer Unit (MCU) is user programmable to allow program changes and lower volume applications. Single-chip microcomputer U1 is a low cost MCU having parallel I/O capability with pins programmable as input or output. As described in the technical data for the single-chip microcomputer, it has an internal 8-bit timer with 7-bit programmable prescaler, an on-chip oscillator, memory mapped I/O, versatile interrupt handling, bit manipulation, bit test and branch instruction, vectored interrupts, bootstrap program in read-only memory (ROM), 1804 bytes of EPROM, 112 bytes of RAM and 20 TTL/CMOS compatible bidirectional I/O lines. The complete operational and electrical specification for this Motorola single-chip microcomputer MC68705PC3 can be found in the Microprocessor, Microcontroller, and Peripheral Data book, Volumes 1 & 2, available from Motorola.

Single-chip microcomputer U1 is connected as shown at pins 1, 4, and to run under crystal XTAL at 3.2768 MHz with capacitor C3, which is 25 picofarad, 1000 Volt.

Pins 2, 3, 6, and 7 are tied to the 5-Volt power supply Vcc. In this particular schematic design for U1 and the distributor 70, the hardware interrupt at pin 2 is not used.

A reset switch SW1 is connected through PC board mount P2 at pins 8 and 9 and capacitor C4 to single-chip microcomputer U1 at pin 28. Capacitor C4 is 1 microfarad, 50 Volt and sufficient for the delay requirements of about 100 milliseconds before allowing the resent input to go high. As will hereinafter be explained in more detail, depressing reset switch SW1 sends a low signal to pin 28 that causes a vectored reset jump into INIT routine as shown in FIGS. F1 and F2. to initialize the distributor 70.

Single-chip microcomputer U1, pins 8 (STBPRES) and 19 (CLRSTB) are used to monitor the line STB IN of the parallel interface 300. Referring briefly back to FIG. 5, single-chip microcomputer U1, pin 8 is connected to flip-flop U2, Pan A, at pin 6 (STBPRES); and single-chip microcomputer U1, pin 19 (CLRSTB) is connected to the flip-flop U2, Pan A, at pin 1 to reset the flip-flop after the strobe in signal has been received by the single-chip microcomputer U1. The strobe signal from PC board connector P1, at pin 1 is buffered by integrated circuit U4, Part B, at pin 5 having its output pin 6 is connected to PC board connector P1, at pin 2 to have adequate drive to the conventional printer 50. An active low strobe signal input sets the flip-flop U2, Part A, at pin 4 to generate a low signal at pin 6, which is connected to pin 8 of the single-chip microcomputer U1 shown in FIG. 7. The single-chip microcomputer U1, at pin 8 (STBPRES), checks the low signal at pin 6 of flip-flop U2, Part A, to identify the status of the strobe signal line. When this strobe signal is active, the single-chip microcomputer of the distributor 70 can recognize that the personal computer 30 is communicating with the printer 50 or other device through the parallel port and split cable.

Single-chip microcomputer U1, pins 20, 21, and 22 are used as inputs to receive data transmission from the parallel port of the personal computer 30 through PC board connector P1. Referring briefly back to FIG. 5, single-chip microcomputer pins 20, 21, and 22 are connected to the data line DATA, the clock line CLK, and the line labeled BUSY IN. Single-chip microcomputer pins 23 (BUSY EN) and 24 (BUSY OUT) are used as outputs connected to acknowledge to the personal computer 30 when a bit of data has been received. Referring briefly back to FIG. 5 again, single-chip microcomputer pin 23 (BUSY EN) is connected to integrated circuit U4, Part D at pin 13. to either select signal BUSY IN from PC board connector P1 at pin 6, or to select BUSY OUT from U1 at pin 24. The BUSY line is pulled high by resistor R4 to satisfy the tri-state of U4, Parts C and D. In normal operation of the personal computer 30 and printer 50, this BUSY EN is low to allow the BUSY IN signal to pass through buffer U4, Part D. When the personal computer 30 and the distributor 70 are in communication, the BUSY EN line is high to disable the integrated circuit U4, Part D, and the signal BUSY OUT from single-chip microcomputer U1, pin 24, is transmitted through the integrated circuit U4, Part C, to PC board connector P1 at pin 7 (BUSY).

Pins 2–7 of the pin board connector P1 shown in FIG. 6 are used to communicate with the personal computer 30. Communication is sent serially from the personal computer parallel port to the distributor 70, one bit at a time. For example, to send a high bit of data to the distributor 70, the personal computer 30 does the following:

(1) sets the DATA line high;

(2) toggles the state of the CLK line (low to high or high to low);

(3) when the distributor 70 has received the single bit of data, the single-chip microcomputer U1, at pin 23 (BUSY EN) will disable the BUSY IN signal at pin 13 of U4, part D and acknowledge BUSY by toggling the BUSY OUT signal from U1, pin 24 through U4, part C; and (4) after receiving the acknowledgement signal from the distributor, the personal computer will loop back to step (1) to send the next single bit of data.

The communication between the personal computer 30 and the distributor 70 will hereinafter be explained in more detail with reference to the algorithm flow charts.

Single-chip microcomputer U1 pins 9 (RNGPRES) and 18 (CLRRNG) are used to communicate with the phone ring interface 400. Referring briefly to FIG. 6, single-chip microcomputer U1, pin 9 is connected to the phone ring interface 400 at flip-flop U2, Part B, pin 9, which signals the presence of a telephone ring detected at phone jack J3; and single-chip microcomputer U1, pin is connected to the flip-flop U2, Part B, at pin 13, to reset the flip-flop after a ring signal is received by the single-chip microcomputer U1.

Single-chip microcomputer U1, pin 17 generates a low signal to turn on LED 116 through resistor R20 to indicate ring mode is selected. Resistor R20 is 560 Ohm, ¼ Watt. When the incoming ring is detected, this pin is pulled high to turn off LED 116 by the application firmware.

As will be described with reference to the firmware algorithm flow charts of FIGS. 9A–9S, the single-chip microcomputer U1 checks for a preselected number of ring signals at the phone ring interface 400, which in the preferred embodiment can be anywhere between one and fifteen rings. The distributor 70 turns the personal computer 30 on only if the set of rings reaches the preselected number of rings.

As will also hereinafter be described in more detail, single-chip microcomputer pins 12–16 (CTRL-1, CTRL-2, CTRL-3, CTRL-4, CTRL-5, respectively) are used to control, i.e., turn on and off, the relays 601, 602, 603, 604, and 605 for connecting electrical power to the power connectors of the distributor 70.

Figure 8:
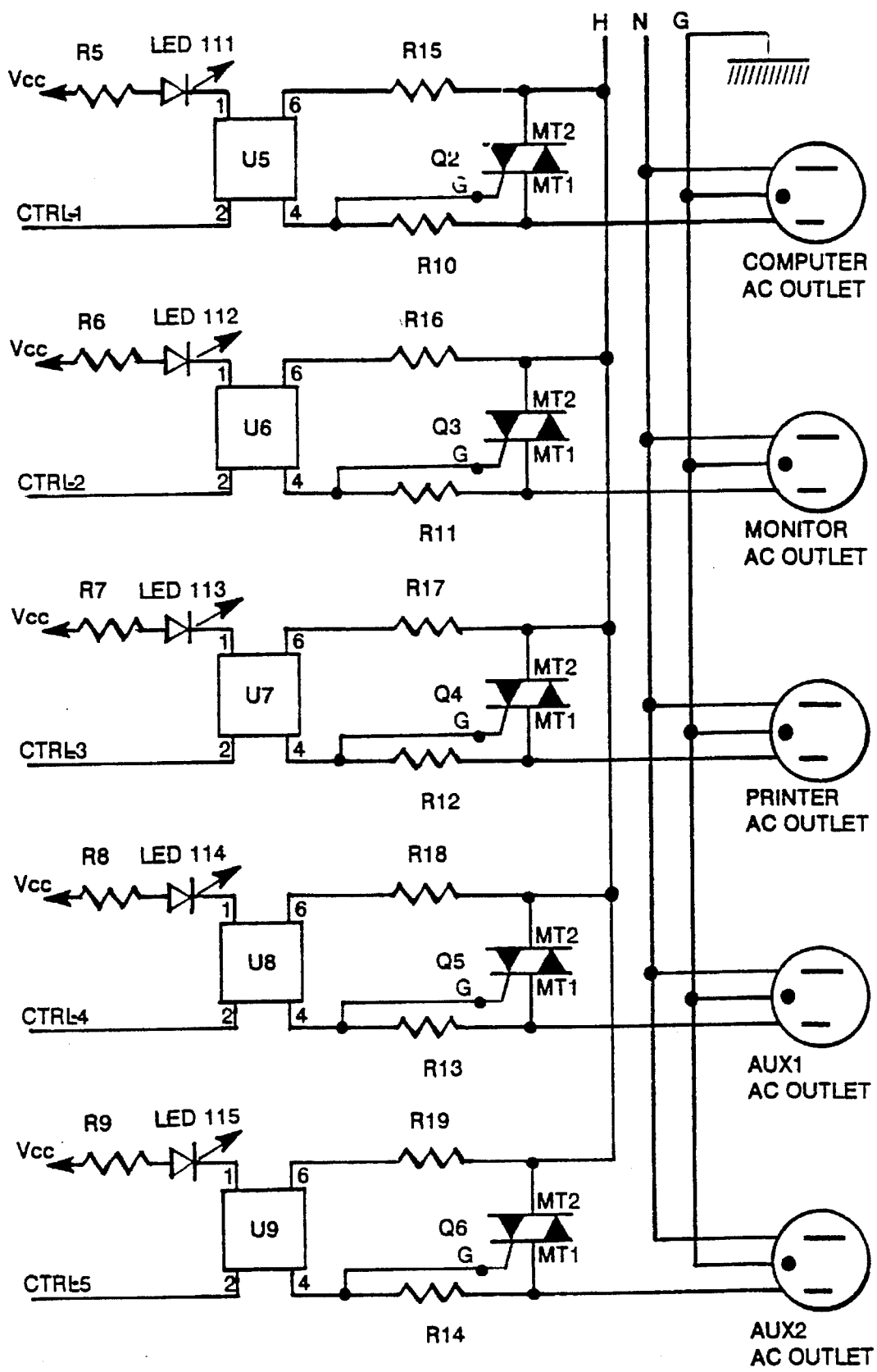
FIG. 8 is a schematic diagram of a preferred embodiment of one of the solid-state relays for selectively connecting power to one of the distributor electrical outlets.

FIG. 8 of the drawing is a schematic diagram of a preferred embodiment of the solid-state relays 601–605 for connecting power to the distributor AC electrical outlets 101–105; respectively. For example, to turn on the relay 601 to supply AC power to outlet 101, which is preferably designated for the plug of personal computer 30, the single-chip microcomputer U1 sends a low signal at pin 12, line CTRL-1, which is connected to triac driver U5 at pin 2. Triac driver U5 is identified as commercially available from Motorola as Part No. MOC3031. Pin 1 of the triac driver U5 is connected through resistor R5 to LED 111. Resistor R5 is 220 Ohm, ¼ Watt. Pins 4 and 6 of the triac driver U5 are connected to triac Q2 at gate G and resistors R10 and R15 as shown. Triac Q2 is 120 Volt, 8 Ampere, Part No.

L200816-ND; resistor R10 is 1K Ohms, ¼ Watt; and resistor R15 is 27 Ohms, ¼ Watt. Thus, AC Hot power line is selectively connected from MT2 to MT1 of triac Q2 to provide power to AC outlet 101 of the distributor 70. At the same time, LED 111 is lighted to provide visual indication to the distributor user that the power has been connected to the AC outlet 101. More information regarding the triac Q2 can be found in the Technical Manual from Teccor Electronics for selecting parts for specific relay applications.

Similarly, single-chip microcomputer U1 pins 13–16 are used to selectively connect AC Hot power line to provide electrical power to a AC outlets 102–105, respectively, of the distributor 70. Each of the other relays 602–605 is similar to relay 601. Triac drivers U6–U9 are the same as triac driver U5. Resistors R6–R9 are the same as resistor R5. Triacs Q3–Q6 are the same as triac Q2. Resistors R11–R14 are the same as resistor R10, and resistors R16–R19 are the same as resistor R15. AC outlet 102 is preferably designated for the monitor 40; AC outlet 103 is designated for the printer 50, and AC outlets 104 and 105 are designated AUX1 and AUX2 for auxiliary devices.

Figure 9B:
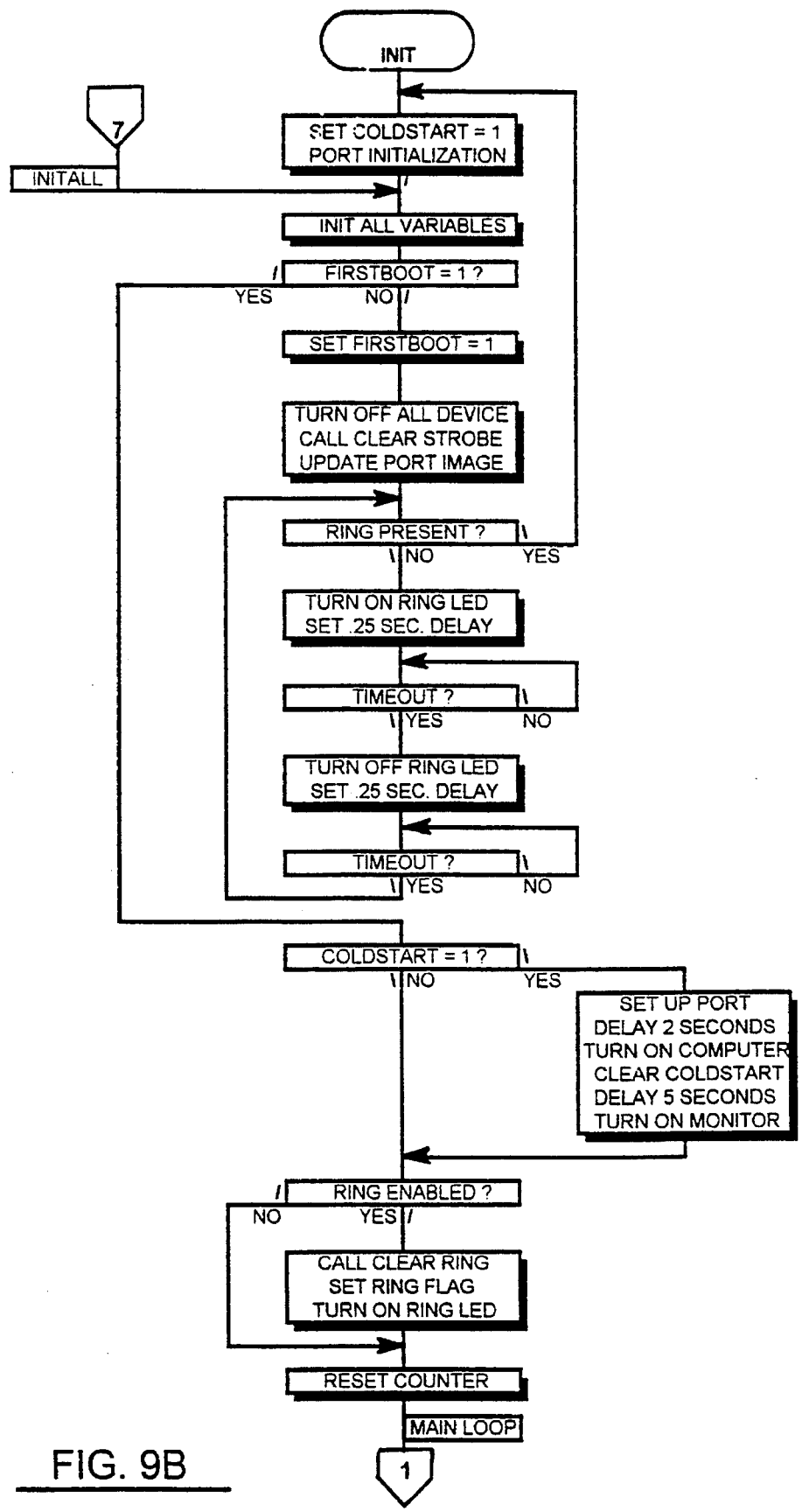
FIG. 9B is a flow chart of the firmware initialization routine called "INIT"
Figure 9C:
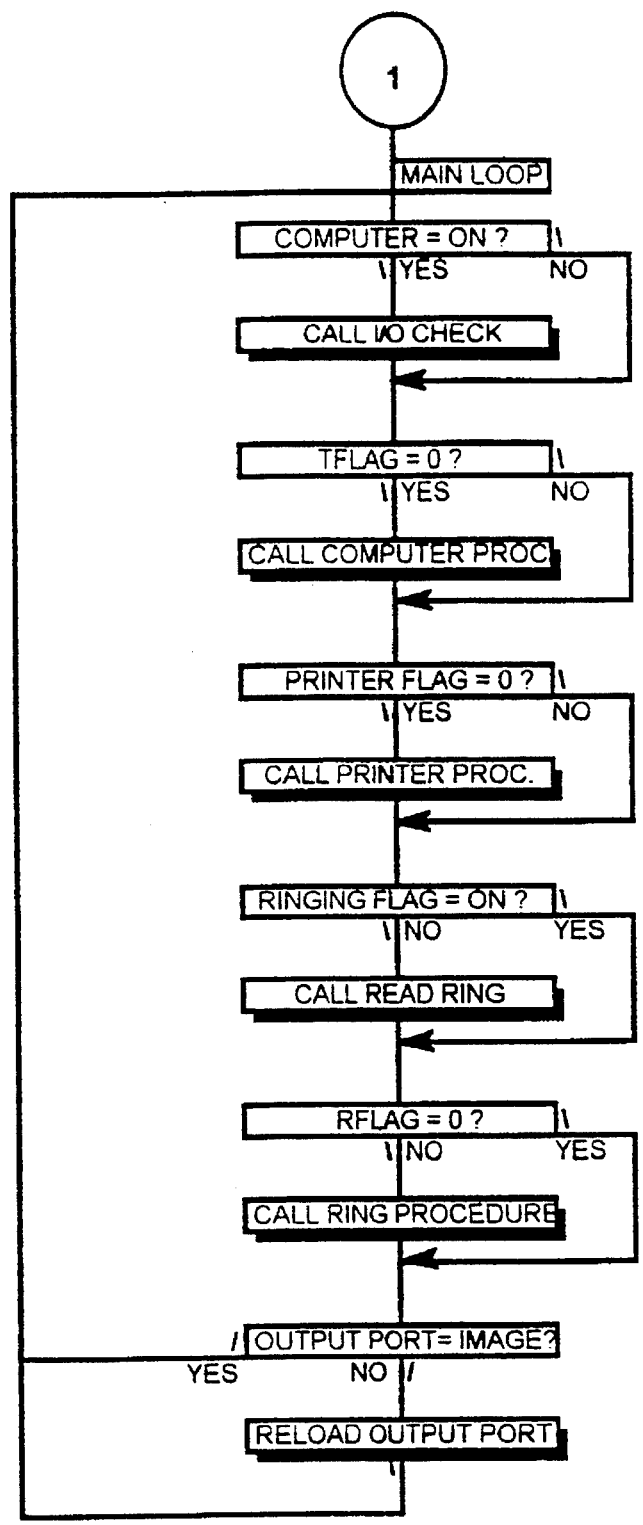
FIG. 9C is a flow chart of the main program loop called "MAIN LOOP"
Figure 9D:
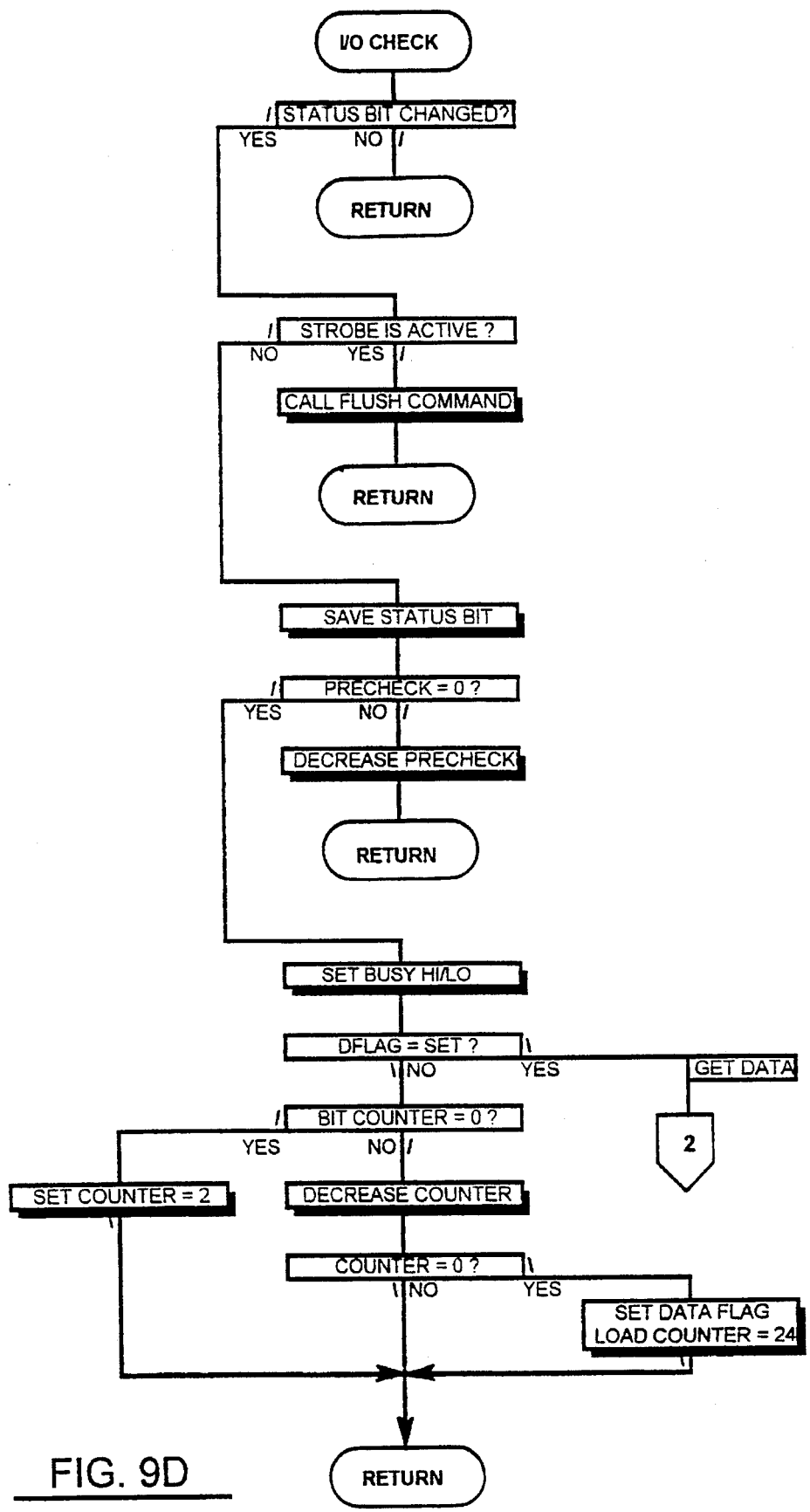
FIG. 9D is a routine called "I/O CHECK" that performs a protocol handshake with the personal computer.
Figure 9E:
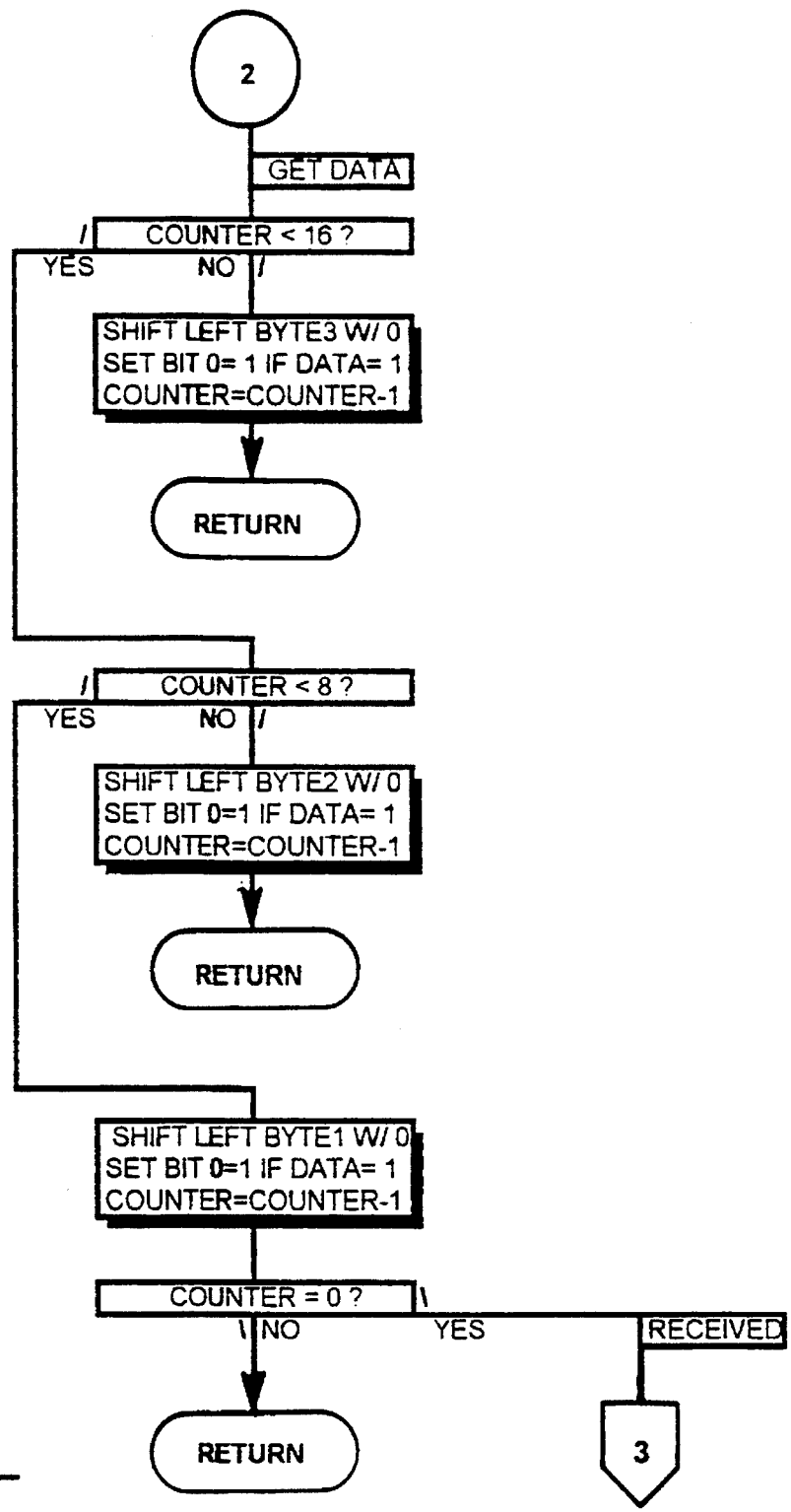
FIG. 9E is a routine called "GET DATA" that gets data after a handshake with the personal computer has been established.
Figure 9F:
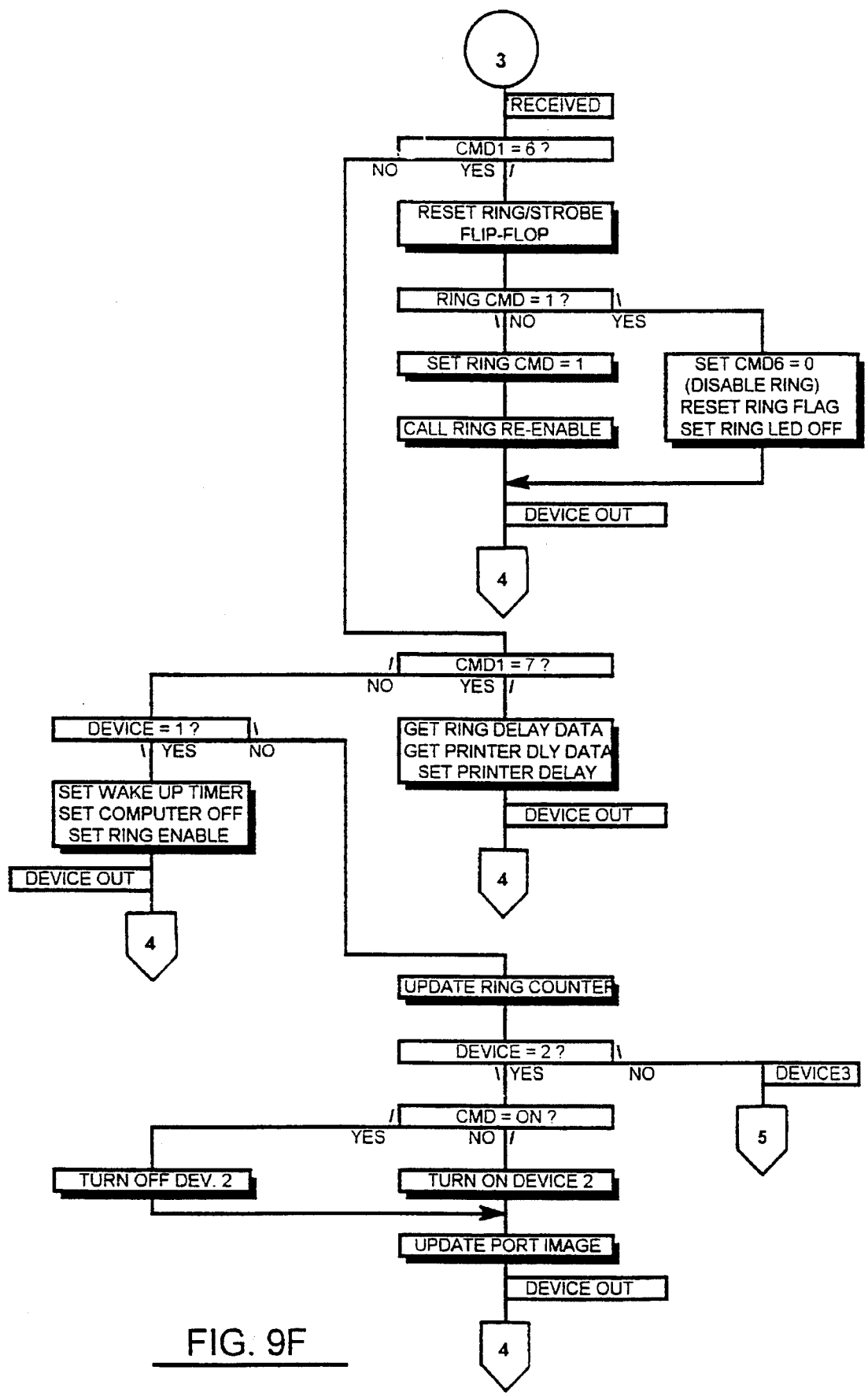
FIGS. 9F and 9G show a routine called "RECEIVED" that is executed when the distributor successfully receives a command from the personal computer.
Figure 9G:
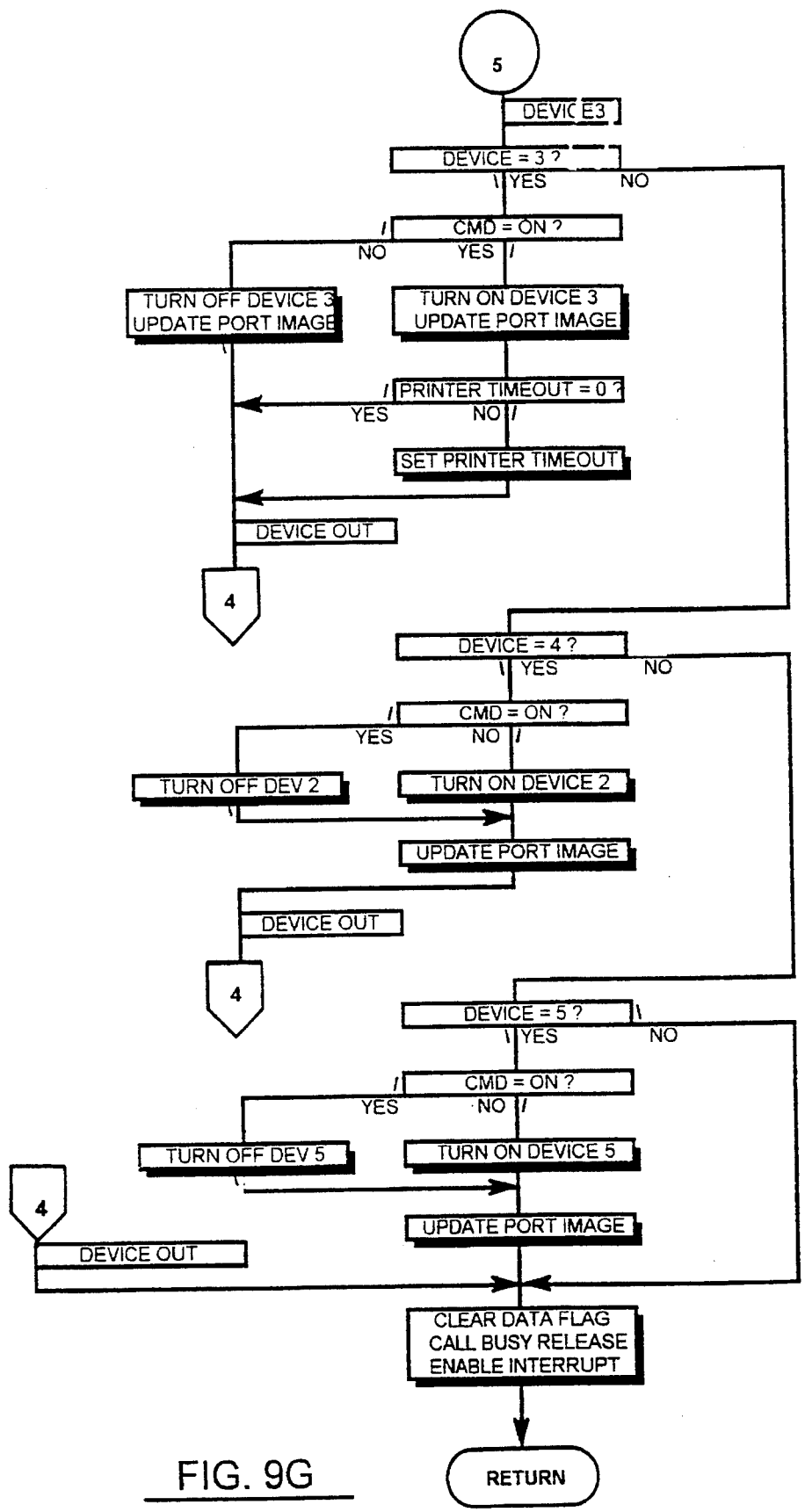
Figure 9H:
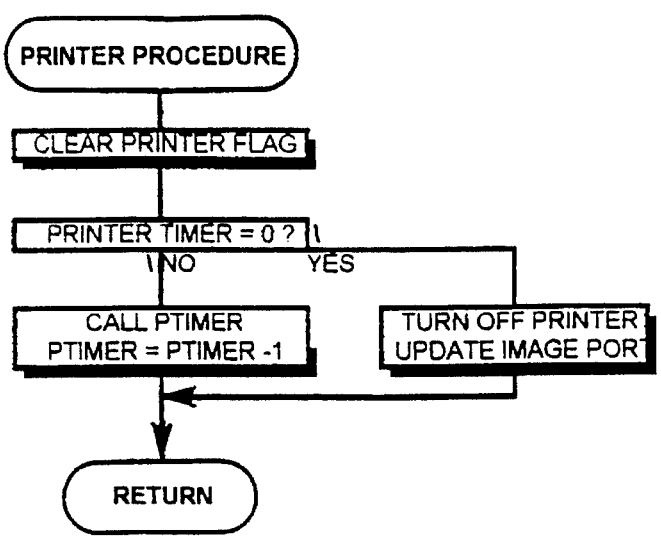
FIG. 9H is a flow chart of the printer time-out routine called "PRINTER PROCEDURE"
Figure 9I:
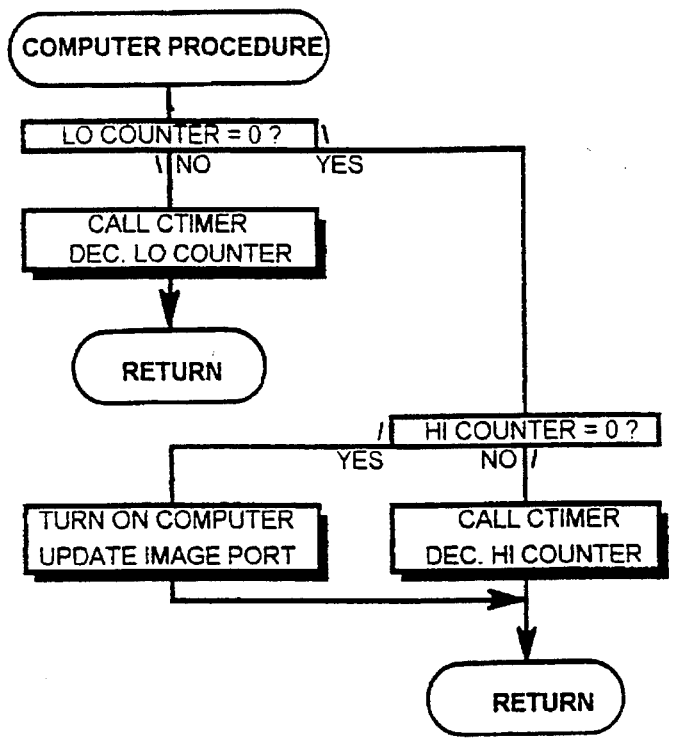
FIG. 9I is a flow chart of the computer time-out routine called "COMPUTER PROCEDURE"
Figure 9J:
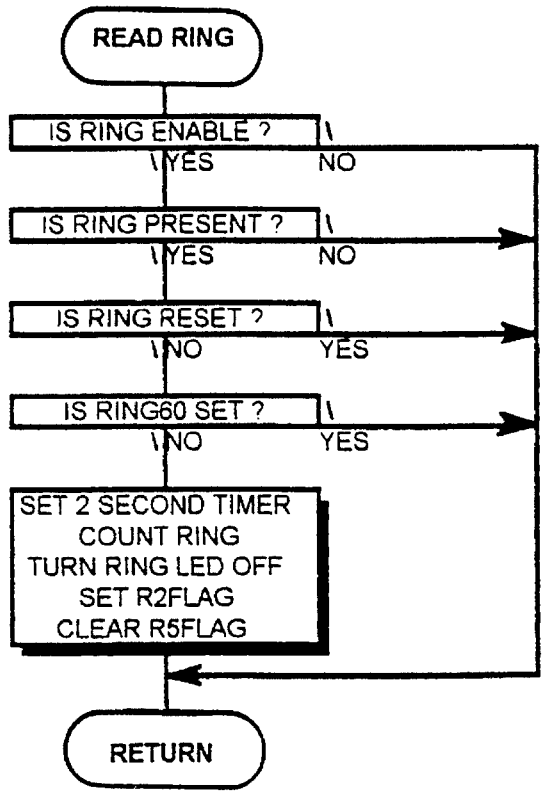
FIGS. 9J and 9K are flow charts of the telephone ring receive protocol to determine if the telephone rings match a preselected number, where
Figure 9K:
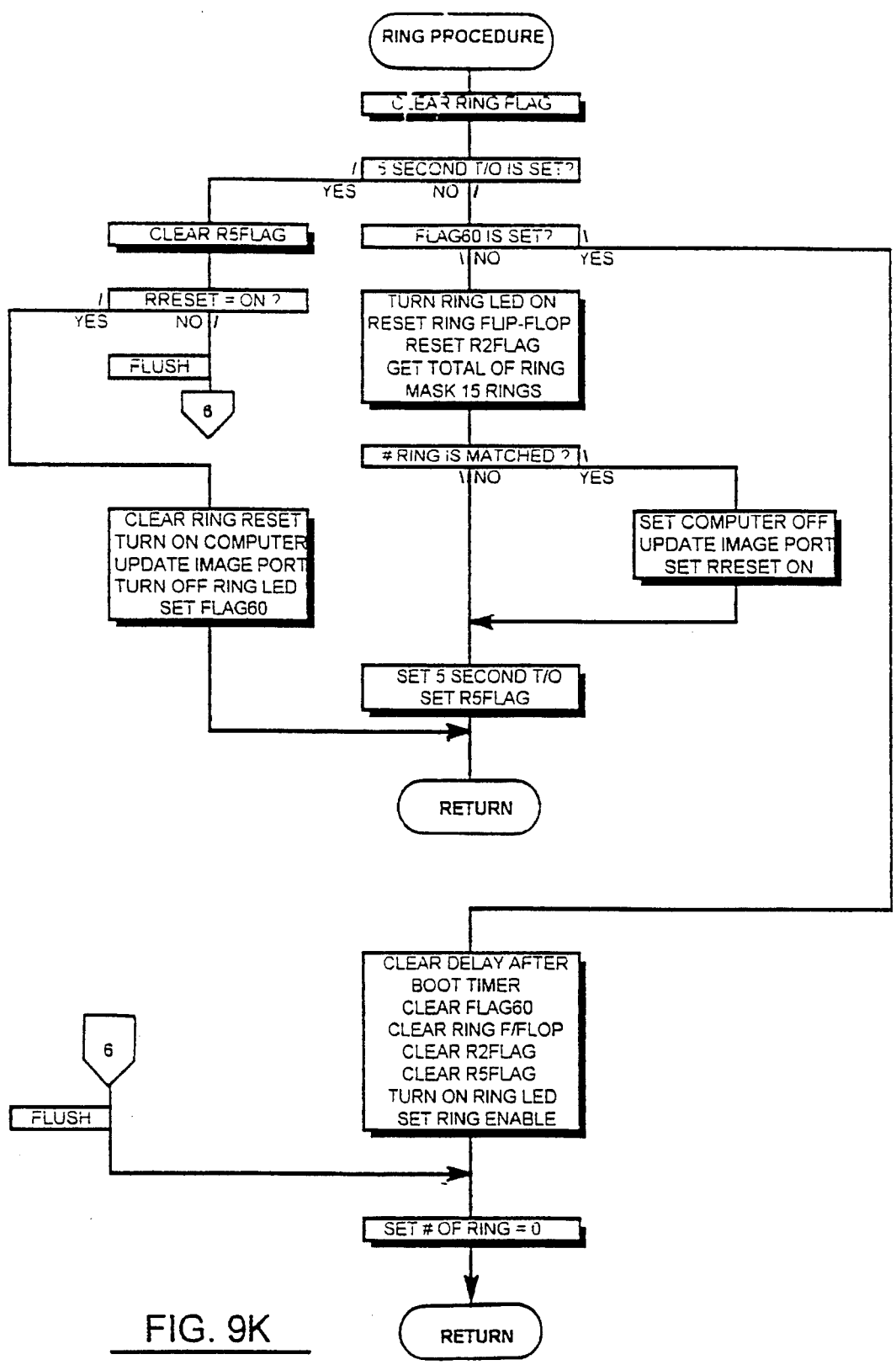
Figure 9L:
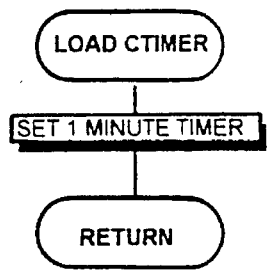
FIGS. 9L through 9R, inclusive, are flow charts of several supporting routines of the algorithm.
Figure 9M:
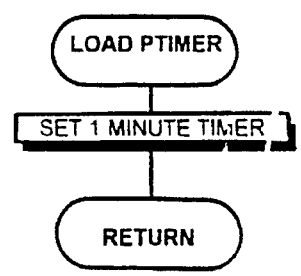
Figure 9N:
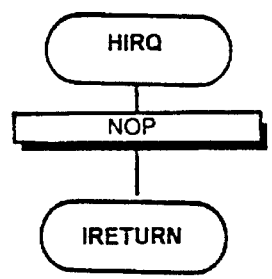
Figure 9O:
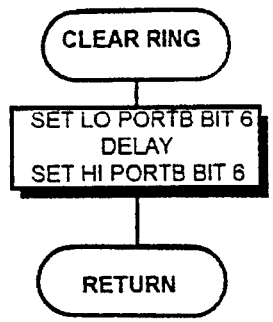
Figure 9P:
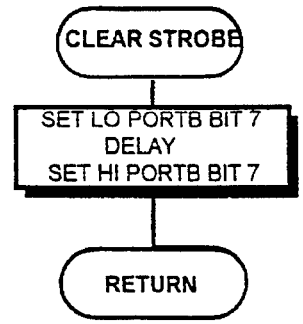
Figure 9Q:
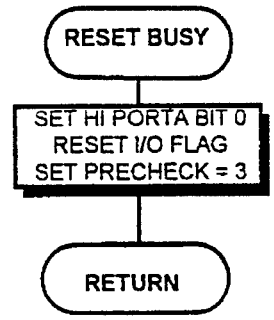
Figure 9R:
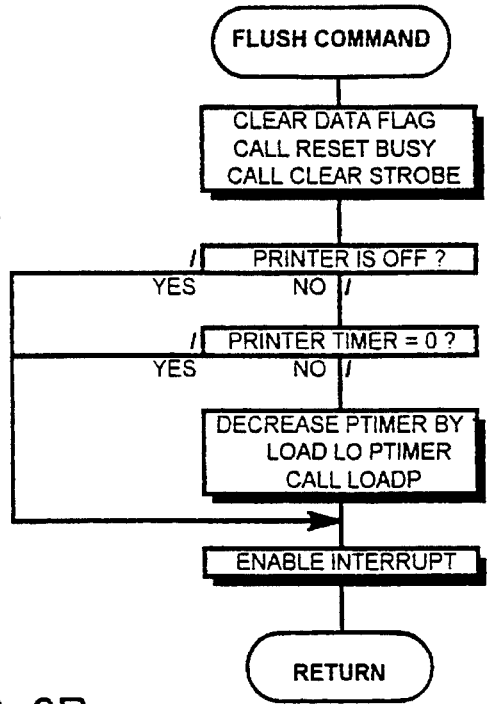
Figure 9S:
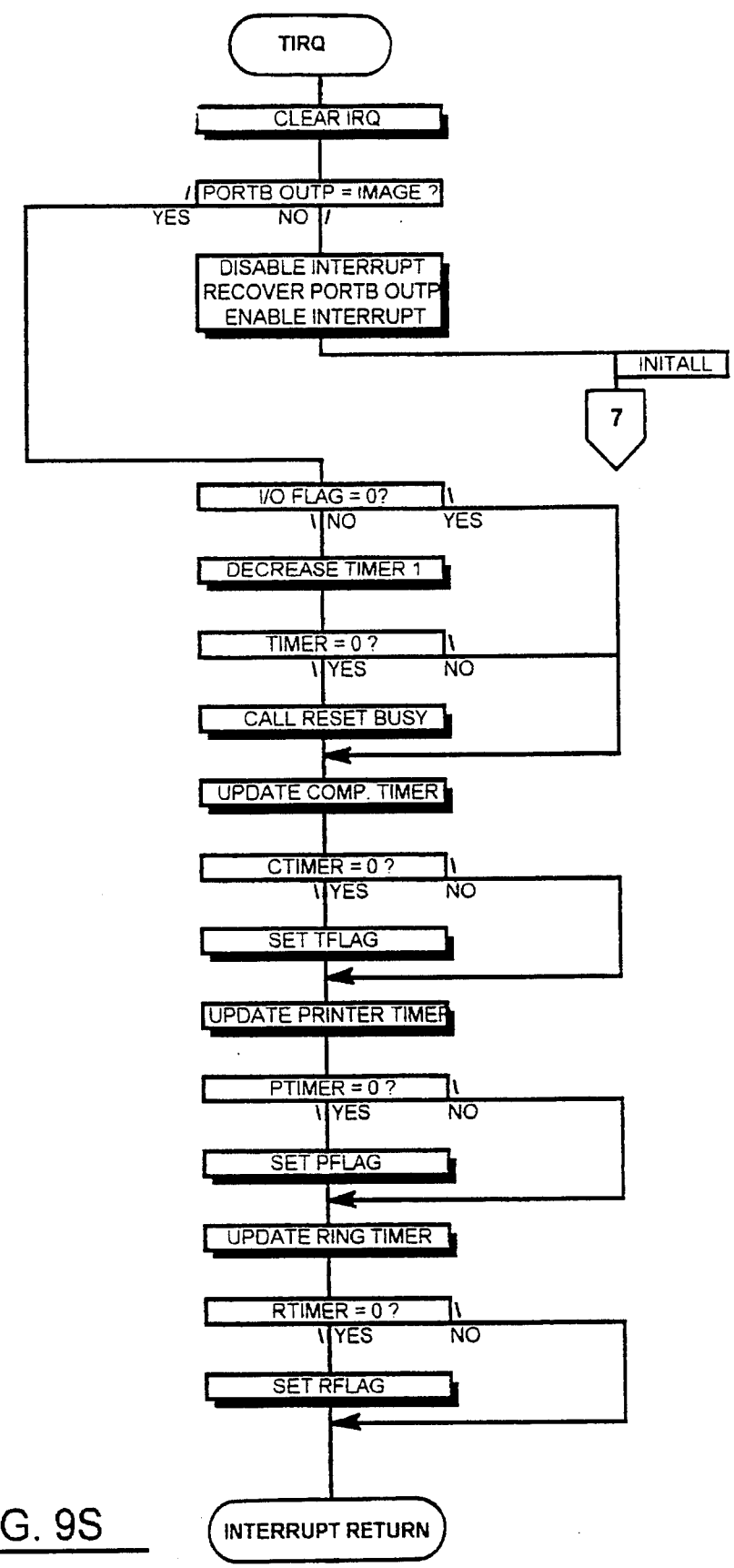

FIGS. 9A–9S, inclusive, show a detailed flow chart of a preferred algorithm for the firmware programming of the single-chip microcomputer U1 of the distributor. As will be readily apparent to those skilled in the art from the flow chart, the single-chip microcomputer U1 of distributor 70 can be programmed to react to highly specific command sequences and data sent by the personal computer 30 through its parallel port to the distributor 70.

Referring briefly to FIG. 9A of the flow charts, the interrupt vector table of the algorithm is shown. As shown in the table, the algorithm will start the "INIT" routine upon any of the following conditions: "Reset," "Software Interrupt," or "Power On." Upon a timer interrupt, the program will jump to a routine called "TIRQ". As previously mentioned, hardware interrupt is not used in the presently most preferred embodiment of the distributor 70, pin 2 of single-chip microcomputer U1 being tied to Vcc.

Referring to FIG. 9B of the flow chart, the algorithm routine starting with the interrupt vector "INIT" for the "Reset," "Software Interrupt," or "Power On" conditions is shown. In this routine, the program initializes all port control lines, I/O lines, the clock, and the application program variables. As can be seen in the flow chart, this INIT routine also has been designed to allow the program to monitor if there has been a power failure due to any power corruption by excessive load caused for example, by high potential short, thunderstorm, etc. If so, the program variable "FIRST-BOOT" will be cleared to zero by the power outage. After the power outage, the flow chart shows that the single-chip microcomputer will check the status of the "FIRSTBOOT" variable. If it is zero, it turns off all power to the AC outlets for the devices plugged into the distributor and enters into an indefinite loop while flashing an LED (LED 116) to notify the user of such event. The intelligent power distributor 70 can be restarted by pressing the reset button SW1 or by a telephone call received at the phone ring interface 400.

FIG. 9C of the flow charts shows the main program routine called "MAIN LOOP." The main loop performs the following functions: (1) checks the communication parallel interface 200 of the distributor 70 to see if the personal computer 30 is turned on, else bypass; (2) updates the computer time-out function if the personal computer 30 is turned off and is in a sleep mode, else bypass; (3) updates the printer time-out if the printer is turned on, else bypass; (4) reads whether a ring signal is present if it is not in the ring receiving process, else bypass; (5) processes ring after rings have been received, else bypass; (6) verifies and updates power control output, if necessary, due to fluctuation in AC power loading, power interrupt, power shock excitation, etc.

FIGS. 9D through 9G of the flow charts show the communication protocol with the personal computer 30. These algorithms show how the single-chip microcomputer U1 of the distributor 70 verifies, gets, and acknowledges data from the parallel port of the personal computer 30. The protocol allows for reliable communication between the personal computer 30 and the intelligent power distributor 70.

FIG. 9D shows the routine called "I/O CHECK" for performing an I/O check on the parallel port of the personal computer 30. Specifically, it performs the following steps: (1) checks whether any communication on the parallel port of the personal computer 30 has started; (2) checks whether the communication is intended for the distributor 70; (3) checks whether three synchronization bits have been successfully received; and (4) checks whether two start bits have been successfully received from the personal computer 30. If all four of these protocol handshake steps are successful between the personal computer 30 and the intelligent power distributor 70, then the program goes to the "GET DATA" routine shown in FIG. 9D.

FIG. 9E shows the algorithm called "GET DATA" for serially receiving 24 consecutive bits of data and placing these bits of data in the appropriate places of three bytes of data.

FIGS. 9F and 9G show the algorithm routine called "RECEIVED" for execution of the three bytes of command data successfully received from the personal computer 30 in the previously described "GET DATA" routine. These execution steps can be summarizes as follows: (1) if the received command equals 6, then toggle the King Enable/Disable; (2) if the received command equals 7, then update preselected number of telephone rings that the distributor 70 should respond to and also update the printer timer; (3) if the received command equals 1, then turn off the personal computer 30 and set the computer time-out period and set the Ring Enable to enabled; (4) if the received command equals any one of 2, 3, 4, or 5, then turn on or turn off the appropriate AC outlet 101–105 of the intelligent power distributor 70, except that if the command is to turn on DEVICE-3, which is normally expected to be the printer 50, then the command will also set the printer time-out period. If DEVICE-3 is not used for the time-out period, then the distributor will automatically disable it. Note that the time-out period for the printer 50 (DEVICE 3) will be restarted whenever a printing job is in progress, which the intelligent power distributor 70 can detect by monitoring the printer flag status. The printer flag status line is connected to the parallel cable 80 that is shared by the printer 50 and distributor 70. In other words, this printer time-out period will not be reloaded as long as the printer is being used, and will be expired whenever the printer 50 is not in use. This feature can be implemented for other devices if additional input sensing is provided to the distributor 70 for monitoring the use of the other devices. Just one of practically limitless examples, the distributor 70 can turn a light on in response to input from a motion detector, or even turn on the computer so that it can automatically report the motion to a security service.

FIG. 9H shows the printer support routine called "PRINTER PROCEDURE." This routine periodically updates the printer timer until the time-out period is exceeded, at which time the intelligent distributor 70 can turn off the printer 50.

FIG. 9I is the computer support routine called "COMPUTER PROCEDURE." This routine periodically updates the computer timer until the time-out period is exceeded, at which time the intelligent power distributor 70 will connect power to the AC outlet 101 for the personal computer 30 to turn the personal computer 30 back on.

FIG. 9J is the "READ RING" routine for the phone ring interface feature of the algorithm. This routine checks that the following conditions are satisfied before starting to read a telephone ring signal: (1) that Ring Enable is actually enabled; (2) that the telephone line is actually ringing; (3) that the algorithm in the ring detector process; and (4) that the algorithm is not in the ring reset process. If all four of these conditions are met, then it sets a two second timer, counts the ring number, turns the ring detected LED off, and sets the algorithm flags as appropriate.

FIG. 9K is the "RING PROCEDURE" of the algorithm. This routine is to process a telephone ring signal. After completion of receiving a telephone ring, the matching ring should be verified. If the preset ring number stored in the microcomputer memory is matched, the distributor 70 turns off the personal computer 30, and then just five seconds later it will turn it back on. This is used as a reset to solve many existing problems with the personal computer being hung-up. But if different, it will abort the call.

FIGS. 9L through 9R are flow charts of the supporting routines of the algorithm.

FIG. 9S shows the flow chart for the timer interrupt routine "TIRQ" of the algorithm. The internal timer is set to automatically call this routine every 5 milliseconds. Upon getting this "TIRQ" routine call, any other activity will be temporarily stopped and will resume after this routine process is completed. The main function of this interrupt call is to update (decrease timers) and set appropriate flags so other routines and monitor and execute at appropriate times.

Figure 10A:
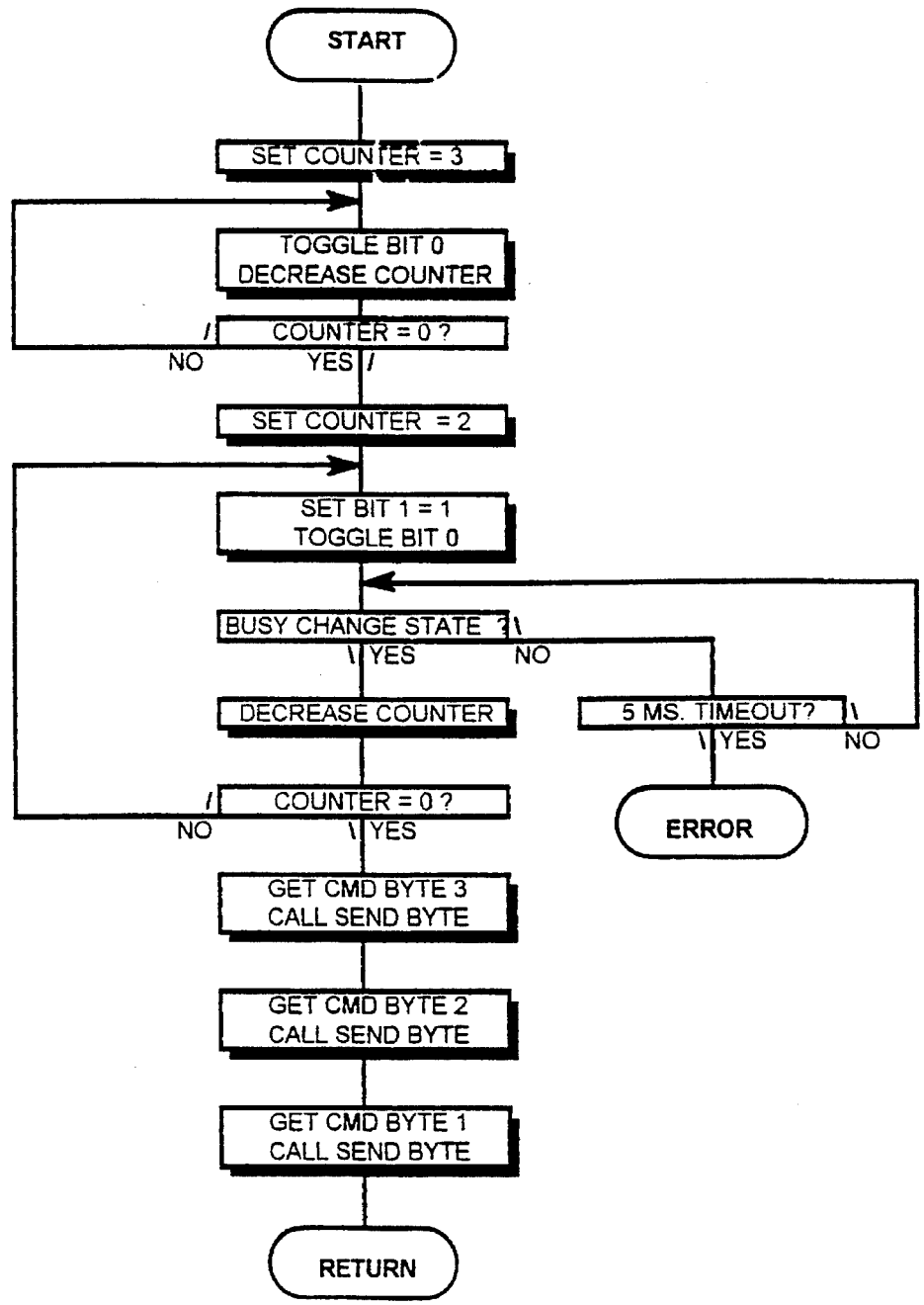
FIGS. 10A and 10B show the flow chart for the handshake protocol and communication routine of a software program that can be loaded on the personal computer for communicating and controlling the intelligent power distributor.
Figure 10B:
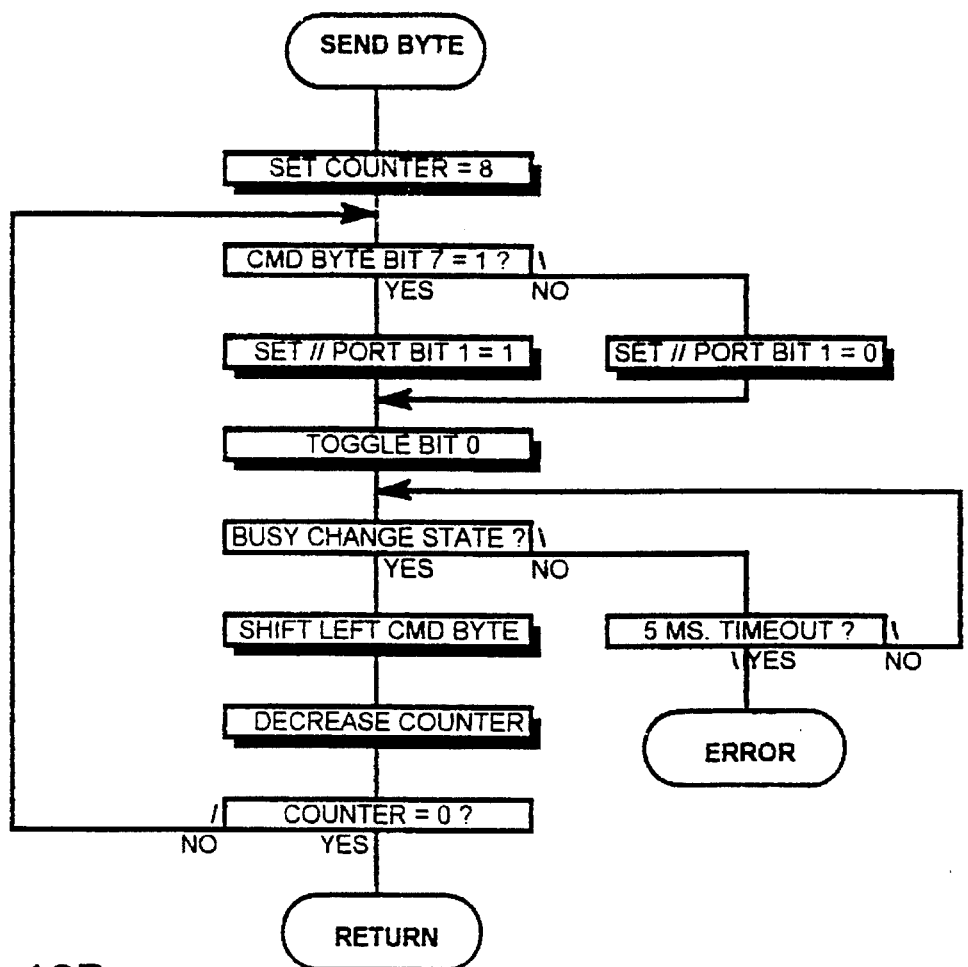

FIGS. 10A and 10B show the flow chart for the handshake protocol and communication routine of a portion of the software program that can be loaded on the personal computer for communicating and controlling the intelligent power distributor. This flow chart establishes communication with the distributor 70 and serially sends three bytes of command information to the distributor.

FIG. 10A shows the flow chart for a software program that first sends three synchronous bits of data to the distributor 70 to establish a handshake that meets the required protocol. The software program then sends two high bits of data to start the serial transmission of a command. Finally, the software program serially sends three bytes of commands to the distributor 70.

FIG. 10B shows the "SEND BYTE" routine called in the flow chart of FIG. 10A. This routine sends the highest bit (bit 7) of the first byte to the parallel port of the personal computer 30 for the distributor 70 to read. The routine then checks for a busy response within a specified period from the distributor 70. If the software program receives the correct response, it will shift left one bit of the command byte for the next bit of data transmission. This loop will be repeated until all the bits of a command byte of data have been serially sent to the distributor 70. If an error occurs, the software program will jump to an error routine, not shown in detail, which would, for example, notify the user of the error, or automatically retry several times before it exits the application software.

Thus, the intelligent power distributor 70 and method of the invention are directed toward solving the problem of wasted electric power. They also minimize the problem of voltage spikes and power surges, which can damage the electronic circuitry of the personal computer and other devices. The distributor 70 allows the user of the personal computer 30 to specify the time, manner, and sequence of switching power on and off to the personal computer itself, personal computer peripheral devices, and other devices electrically connected to the distributor. The distributor 70 minimizes power consumption, and it also minimizes voltage spikes and power surges to which the personal computer 30 and other devices having delicate electronic circuitry are subjected.

It is to be understood of course that the foregoing description relates to a preferred embodiment. Numerous modifications and alterations thereof can be made without departing from the scope and spirit of the invention as set forth in the appended claims.

Having described the invention, what is claimed is:

1. Apparatus for controlling electrical power supplied from a power source through power cords to a personal computer and other electrical devices, the apparatus being controlled through a parallel port of the personal computer, the apparatus comprising:

(a) a power lead connector connectable through a power lead to the power source;

(b) a plurality of AC outlets for receiving the power plugs of a personal computer and other electrical devices;

(c) a plurality of relays for selectively controlling electrical power from said power lead connector to each of said AC outlets;

(d) a data communication interface connectable to the parallel port of the personal computer through a parallel cable; and (e) a single-chip microcomputer having an electronic storage device and a clock connected to said plurality of relays and to said data communication interface connectable to the parallel port of the personal computer and operating said plurality of relays at the preprogrammed times specified by the data from the personal computer to selectively control electrical power to each outlet of said plurality of AC outlets, said single-chip microcomputer monitoring a control signal of the parallel port of the personal computer to distinguish communications intended for another personal computer peripheral device connected to the parallel port of the personal computer, whereby the apparatus can share the parallel port of the personal computer with another personal computer peripheral device.

2. An apparatus according to claim 1, wherein said single-chip microcomputer is monitoring and responding to a control signal intended for another personal computer peripheral device.

3. An apparatus according to claim 2, wherein the control signal is a strobe data line.

4. An apparatus according to claim 1, further comprising a split-Y parallel cable such that said data communication interface of the apparatus can share the parallel port of the personal computer with a personal computer peripheral device through said split-Y parallel cable.

5. An apparatus according to claim 1, wherein said single-chip microcomputer instructs at least one of said relays to connect electrical power to at least one of said AC outlets after a preselected time-out period, the personal computer having provided said single-chip microcomputer of the apparatus with the preselected time-out period.

6. An apparatus according to claim 5, wherein one of said AC outlets is specifically designated for receiving the power plug of the personal computer, said single-chip microcomputer selectively operating one of said plurality of relays to connect electrical power to said AC outlet designated for the personal computer, whereby the apparatus can turn on the personal computer after the preselected time-out period.

7. An apparatus according to claim 1 further comprising: a telephone line jack connectable to a telephone line; and a phone ring interface electrically connected to said telephone line jack and to said single-chip microcomputer when a ring signal is received on the telephone line; said single-chip microcomputer having programming to respond to a predetermined telephone ring sequence and for operating at least one of said plurality of relays to connect electrical power to at least one of said AC outlets, the personal computer having provided said single-chip microcomputer with the preselected ring sequence.

8. An apparatus according to claim 7, wherein said single-chip microcomputer is programmed to analyze the signal burst of a telephone ring.

9. A method of controlling distribution of electrical power to a personal computer, personal computer peripherals, and other devices through a parallel port of the personal computer, the method comprising the steps of:

(a) connecting an intelligent power distributor to the parallel port of the personal computer to share the port with a peripheral computer device, the intelligent power distributor having a power cord for electrically connecting to an AC power source, AC electrical outlets for receiving the power plugs of the personal computer and other electrical devices, a single-chip microcomputer, and relays for connecting electrical power from the power cord to each of the AC electrical outlets;

(b) connecting the power cord of the distributor to a power source;

(c) connecting the electrical power plug of the personal computer to one of the AC outlets of the intelligent power distributor;

(d) transmitting control data from the port of the personal computer to the intelligent power distributor;

(e) validating the control data with the single-chip microcomputer of the intelligent power distributor by monitoring control signals of the parallel port of the personal computer; and (f) using the personal computer to instruct the intelligent power distributor to selectively connect at predetermined times electrical power from the power cord to one or more of the individual AC electrical outlets of the intelligent power distributor, thereby controlling the times power is supplied to the personal computer and any other devices plugged into the AC electrical outlets of the intelligent power distributor.

10. A programmable power distributor for selectively controlling and distributing electrical power from a power source to a personal computer and other electrical devices, the distributor comprising:

(a) a power lead connectable to the power source;

(b) a plurality of electrical sockets for receiving the power plugs of the personal computer and other electrical devices;

(c) a plurality of relays operably connected to selectively and independently connect said power lead to each of said AC outlets;

(d) a single-chip microcomputer for selectively and independently operating said relays, said single-chip microcomputer having an on-board clock, whereby it can selectively operate each relay of said plurality of relays at programmed times; and (e) a data transfer interface operably connected to said single-chip microcomputer, whereby said microcomputer can be connected through a parallel cable to a parallel port of the personal computer so that the personal computer can communicate program data instructions to said single-chip microcomputer, said single-chip microcomputer monitoring control signals of the parallel .port for distinguishing between instructions intended for the distributor and instructions intended for other personal computer peripherals so that the distributor can share the parallel port of the personal computer with another personal computer peripheral.

11. A programmable power distributor according to claim 10, further comprising a telephone jack for a telephone line, said jack operably connected to said single-chip microcomputer, wherein said distributor detects telephone ring signals received at the telephone jack and interprets a programmed sequence of ring signals into instructions for selectively operating said relays.

12. A programmable power distributor according to claim 10, further comprising means for monitoring the activity of an electrical device, and for operating one of said relays to disconnect electrical power to the electrical device after a predesignated time-out period of non-use measured by the on-board clock of the single-chip microcomputer.

13. A programmable power distributor according to claim 10, further comprising: an AC/DC converter connected to said power lead connector of the distributor for converting AC power to DC current to drive said data transfer interface, said single-chip microcomputer, and said relays of the distributor.

14. A programmable power distributor according to claim 10, wherein one of said electrical sockets is designated for the personal computer, said single-chip microcomputer providing a default "on" setting for said relay controlling said designated socket whereby, before the distributor receives any programming instructions through the parallel port of the personal computer, the default condition of the distributor provides power to the personal computer.

15. A programmable power distributor according to claim 10, wherein said relays are solid state with zero volt switching so that the AC power can be turned on or off more smoothly, minimizing radio-frequency interference (RFI) and electromagnetic interference (EMI).

16. A programmable power distributor according to claim 10, wherein communicating with the distributor is made user friendly by including a software package for the personal computer that translates commands from the user into commands sent through the parallel port of the personal computer.

\* \* \* \* \*

UNITED STATES PATENT AND TRADEMARK OFFICE
CERTIFICATE OF CORRECTION

PATENT NO. : 5,506,790

DATED : April 9, 1996

INVENTOR(S) : Sanh K. Nguyen

It is certified that error appears in the above-indentified patent and that said Letters Patent is hereby corrected as shown below:

In Column 8, line 57 change "101105" to -- 101-105 --;

In Column 10, line 40 the word "convening" should be -- converting --;

In Column 11, line 9 change "pins 1, 4, and to run" to -- pins 1, 4, and 5 to run --;

In Column 12, line 31 change "microcomputer U1, pin is" to -- microcomputer U1, pin 18 is --;

In Column 14, line 33 the word "King" should be -- Ring --.

Signed and Sealed this

Second Day of July, 1996

Attest:

BRUCE LEHMAN

Attesting Officer

Commissioner of Patents and Trademarks